United States Patent
McKibben et al.

(10) Patent No.: US 7,139,761 B2
(45) Date of Patent: Nov. 21, 2006

(54) DYNAMIC ASSOCIATION OF ELECTRONICALLY STORED INFORMATION WITH ITERATIVE WORKFLOW CHANGES

(75) Inventors: Michael T. McKibben, Columbus, OH (US); Jeffrey R. Lamb, Westerville, OH (US)

(73) Assignee: Leader Technologies, Inc., Westerville, OH (US)

(*) Notice: Subject to any disclaimer, the term of this patent is extended or adjusted under 35 U.S.C. 154(b) by 0 days.

(21) Appl. No.: 10/732,744

(22) Filed: Dec. 10, 2003

(65) Prior Publication Data

US 2004/0122835 A1    Jun. 24, 2004

Related U.S. Application Data

(60) Provisional application No. 60/432,255, filed on Dec. 11, 2002.

(51) Int. Cl.
*G06F 17/30* (2006.01)
(52) U.S. Cl. ...................................................... 707/10
(58) Field of Classification Search .............. 707/1–10, 707/100–104.1; 379/202.01; 715/753; 725/87, 725/112; 709/202, 204, 205
See application file for complete search history.

(56) References Cited

U.S. PATENT DOCUMENTS

| 6,154,465 A | 11/2000 | Pickett |
| 6,236,971 B1 | 5/2001 | Stefik et al. |
| 6,311,228 B1 | 10/2001 | Ray |
| 6,418,461 B1 | 7/2002 | Barnhouse et al. |
| 6,421,678 B1* | 7/2002 | Smiga et al. ................ 707/102 |
| 6,539,371 B1 | 3/2003 | Bleizeffer et al. |
| 2002/0001301 A1 | 1/2002 | Sarkissian et al. |
| 2002/0078150 A1* | 6/2002 | Thompson et al. ......... 709/204 |
| 2002/0143877 A1* | 10/2002 | Hackbarth et al. .......... 709/205 |
| 2003/0069849 A1 | 4/2003 | Stefik et al. |
| 2003/0217096 A1* | 11/2003 | McKelvie et al. .......... 709/202 |

OTHER PUBLICATIONS

International Written Opinion, PCT/US03/39421, mailed Nov. 15, 2004.
Diane Mizrahi; Patent Cooperation Treaty International Search Report; Jun. 27, 2004; Alexandria, Virginia.

* cited by examiner

*Primary Examiner*—Diane Mizrahi

(57) ABSTRACT

A data management tool. The tool is a unified, horizontal system for communications, organization, information processing, and data storage. The tool operates seamlessly with existing platforms, and is a common workflow layer that is automated with a scalable, relational database. The tool uses one or both of a relational and object database engine that facilitates at least many-to-many relationships among data elements. The highest contextual assumption is that there exists an entity that consists of one or more users. The data storage model first assumes that files are associated with the user. Thus, data generated by applications is associated with an individual, group of individuals, and topical content and not simply with a folder, as in traditional systems.

35 Claims, 18 Drawing Sheets

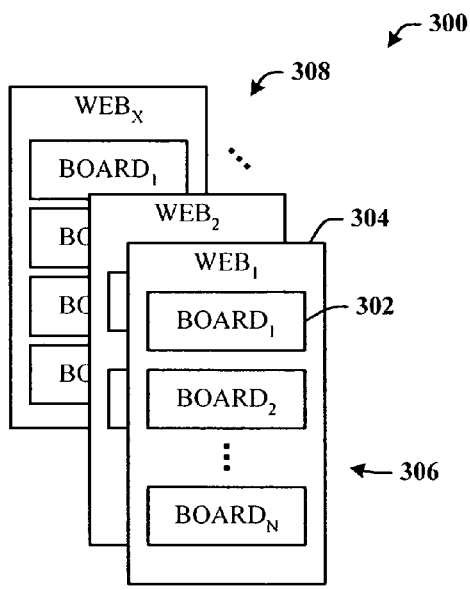
FIG. 3
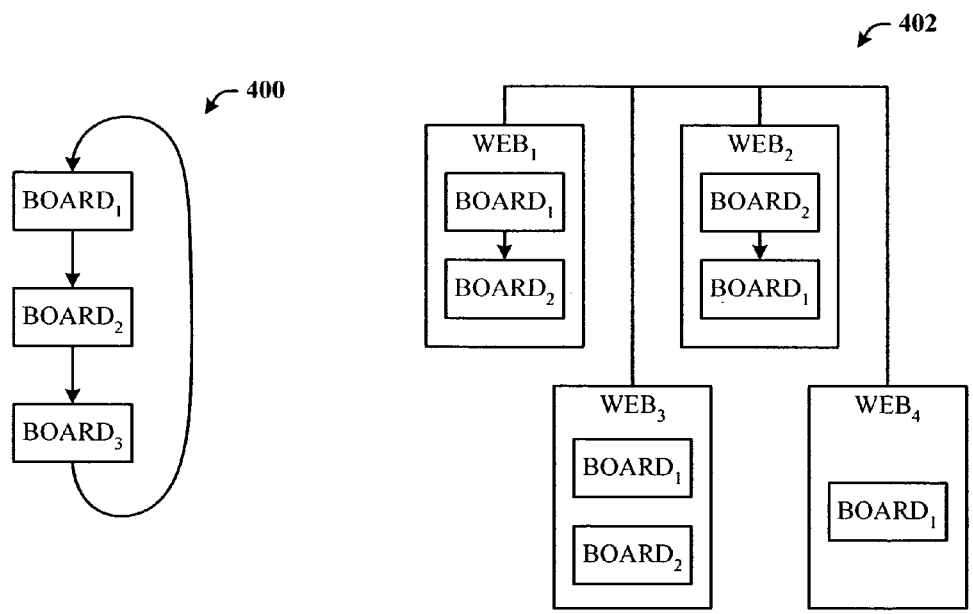
FIG. 4A
FIG. 4B

| WEBS AND BOARDS TABLE | | | |
|---|---|---|---|
| USER(S) | WEB(S) | BOARD(S) | BOARD(S) P/C RELATION |
| 1,2,3 | W1 | B11, B12, B14 | B11: B12; B14 |
| 6 | W2 | B23, B25 | NA |
| 7,8 | W1,W3 | B36,B37 | B36:B37;B36 |
| | | | |
| | | | |

DYNAMIC ASSOCIATION OF ELECTRONICALLY STORED INFORMATION WITH ITERATIVE WORKFLOW CHANGES

CROSS-REFERENCE TO RELATED APPLICATIONS

This application claims the benefit of U.S. Provisional Patent application Ser. No. 60/432,255 entitled "METHOD FOR DYNAMIC ASSOCIATION OF ELECTRONICALLY STORED INFORMATION WITH ITERATIVE WORKFLOW CHANGES", filed Dec. 11, 2002; and is related to U.S. patent application Ser. No. 10/731,906 entitled "CONTEXT INSTANTIATED APPLICATION PROTOCOL" filed on Dec. 10, 2003.

TECHNICAL FIELD

This invention is related to management and storage of electronic information. More particularly, this invention relates to new structures and methods for creating relationships between users, applications, files, and folders.

BACKGROUND OF THE INVENTION

Digital communications presently supply solutions to users in ways that are completely divorced from their business context. A particular item of communication provides little or no inherent understanding of how that communication furthers the purpose and intent of the group or enterprise. In other words, an email (electronic mail) inbox collects email messages about all topics, both business and personal. The email application itself is not discerning about topic, priority, or context beyond perhaps rudimentary "message filters" that will look for certain key words or people, and then place those items in target folders. Generally, the application simply presents a sequential list of messages received. Similarly, a fax machine receives fax pages in sequence. The fax machine is not discerning about topic, priority, or context, and simply outputs fax pages. Once received, it remains the task of the recipient to sort, categorize, and organize these items of communication in ways most meaningful to that person. The organization part of the task generally occurs outside the context of the particular communications tool itself.

Typical methods for organization of communications are limited and fragmented. For example, for an email, the recipient may either leave all the email in the inbox or move it to another electronic folder. For a fax, the recipient is likely to place that received fax in a file folder that is identified by project name or name of recipient. These typical methods of organizing communications are wholly inadequate for a number of reasons. The recipient must do all the work of organization and categorization of the communications rather than the system itself do that work. Automation of the organization of communications is non-existent. The linkage between business strategy and an individual act of communication, a leadership priority, is non-existent. With respect to categorization, the items themselves rarely apply to only one topic of interest. As such, under current systems, the items would need to be manually stored in multiple locations (either electronic or "brick and mortar" folders). For example, a letter faxed to a sales manager may contain information about contact addresses, market intelligence data, specific product requests, and financial accounting.

Data items often relate to organizational issues for which one or more work groups need access; access that is denied when the recipient "buries" that item in his/her personal filing system, electronic or otherwise. Thus, the sharing of knowledge in this context is prohibitive.

Prior art communications tools do not know the business and/or personal context(s) within which files are created and used. For example, a person may create three files in a word processor, one relating to sales, the second relating to operations, and the third relating to a son's football team. However, the word processor itself has no way of knowing to automatically store those three files in at least three different places. Insofar as security and privacy are concerned, the applications and associated file storage methods are generally insecure, not conforming to a single, dependable security model.

Known software applications create and store files outside of a contextual framework. For example, when a user creates a word processing file using a conventional word processor application, the user typically must select a single folder within which to store that file. The file may be stored in an existing folder or the user may create a new folder to receive the file. This file management method is known as Lightweight Directory Application Protocol (LDAP). LDAP borrowed the physical world paper file management scheme where a machine/application creates files, stores those files in individual folders, and stores those folders in cabinets. Under this scheme, context is completely independent of the application. File context is limited to the decision made by the user about the folder in which the file should be stored. The user decision does not adequately represent or reflect the true context of the file given that the file may contain information that could reasonable be stored in multiple folders.

LDAP systems are suited for smaller one-to-many and many-to-one relationships. For example, an e-mail message to ten recipients is a one-to-many relationship, while ten customers sending orders to a single vendor exemplifies a many-to-one relationship. In the case of the former, the e-mail is stored in an Outbox, and the ten recipients store the received message in their respective folders, called an Inbox. In the latter case, the ten received orders are placed in an Orders folder for the associated the product.

Conventional systems are designed to allow multiple users to access the same file for collaboration purposes; however, this feature does not change the basic one-to-many and many-to-one storage paradigm. Conventional systems only attempt to optimize it.

Another limitation of LDAP is that little or no information is contained within the file about the user and, the context and circumstances of the user at the time the file was created. The people elements of an organization are simply too multi-dimensional for the limitations of conventional systems. Current processes designed to add context to files, such as a metadata tagging approach, involve having a knowledge officer view files after they have been stored and create metadata tags with additional key words associated with the file for search purposes.

The best that existing technology has done is to respond to niche requirements where automation made sense: telephone switching, voice mail, e-mail, file transfer, paging, and file storage, for example. The trend is toward a convergence of the technologies, but convergence becomes an enormous problem with these legacy systems that are now encumbered by outdated data handling and storage models that are mainframe and/or hierarchical in nature.

Notwithstanding the usefulness of the above-described methods, a need still exists for a communications tool that associates files generated by applications with individuals, groups, and topical context automatically.

SUMMARY OF THE INVENTION

The following presents a simplified summary of the invention in order to provide a basic understanding of some aspects of the invention. This summary is not an extensive overview of the invention. It is not intended to identify key/critical elements of the invention or to delineate the scope of the invention. Its sole purpose is to present some concepts of the invention in a simplified form as a prelude to the more detailed description that is presented later.

The present invention disclosed and claimed herein, in one aspect thereof, is a data management tool that is a unified, horizontal system for communications, organization, information processing, and data storage. The tool installs on existing platforms, and is a common workflow layer that is automated with a scalable, relational database. The tool includes a relational database engine that facilitates many-to-many relationships among data elements, in addition to, one-to-many and many-to-many relationships.

The data management tool includes a novel architecture where the highest contextual assumption is that there exists an entity that consists of one or more users. The data storage model first assumes that files are associated with the user. Thus, data generated by applications is associated with an individual, group of individuals, and topical content, and not simply with a folder, as in traditional systems.

When a user logs in to the system that employs the tool, the user enters into a personal workspace environment. This workspace is called a board, and is associated with a user context. From within this board, the tool makes accessible to the user a suite of applications for creating and manipulating data. Any user operating within any board has access to the suite of applications associated with that board, and can obtain access to any data in any form (e.g., documents and files) created by the applications and to which he or she has permission. Moreover, thereafter, the user can then move to shared workspaces (or boards), and access the same data or other data.

Data created within the board is immediately associated with the user, the user's permission level, the current workspace, any other desired workspace that the user designates, and the application. This association is captured in a form of metadata and tagged to the data being created. The metadata automatically captures the context in which the data was created as the data is being created. Additionally, the data content is indexed to facilitate searching for the content in a number of different ways in the future by the user or other users. This tagging process is universal, in that, the data model allows for any binary data (e.g., files), as well as any set of definable data to be accepted into the system. The system is not restricted to processing e-mail, faxes, calendar events, meetings, phone calls, etc., that are included in the bundled system, but can also accommodate whatever data the user chooses to use. The system is also universal insofar as its user interaction can be through a browser that is pervasively employed for use with conventional operating systems.

In that the tool supports multiple users, there can be multiple boards. Two or more boards (or workspace environments) can be grouped as a collection of boards, also called a web. Boards can exist in any number of different webs. The association of webs and boards is stored in a table.

As a user creates a context, or moves from one context to at least one other context, the data created and applications used previously by the user automatically follows the user to the next context. The change in user context is captured dynamically. All files and groups of files can be associated with any other file in the system, allowing a system user the flexibility in determining dynamic associations.

In addition to the macro view provided by webs and boards, the user can also create the more familiar hierarchical folders within any board. These are virtual folders, and nothing is physically stored in these folders.

In another aspect of the present invention, the tool provides the seamless facilitation, collection, compilation, and distribution of data.

In yet another aspect of the present invention, the tool provides links to enterprise leadership priorities.

In still another aspect of the present invention, the tool performs communications tasks while simultaneously reminding the user of his/her individual work priorities.

In another aspect thereof, the tool automatically stores contextual information relating to an item of communication and utilizes that contextual information in performance of communication tasks.

In yet another aspect thereof, the tool integrates two or more different applications such as telephony, unified messaging, decision support, document management, portals, chat, collaboration, search, vote, relationship management, calendar, personal information management, profiling, directory management, executive information systems, dashboards, cockpits, tasking, meeting, conferencing, etc., into a common application.

In another aspect thereof, the tool provides a structure for defining relationships between complex collections of data.

In still another aspect of the present invention, the tool provides a process for automating workflow between multiple entities.

To the accomplishment of the foregoing and related ends, certain illustrative aspects of the invention are described herein in connection with the following description and the annexed drawings. These aspects are indicative, however, of but a few of the various ways in which the principles of the invention may be employed and the present invention is intended to include all such aspects and their equivalents. Other advantages and novel features of the invention may become apparent from the following detailed description of the invention when considered in conjunction with the drawings.

BRIEF DESCRIPTION OF THE DRAWINGS

FIG. 3 illustrates a system employing a board and a web in accordance with the present invention.

FIG. 4A illustrates a diagram of board relationships.

FIG. 4B illustrates board/web relationship diagram.

DETAILED DESCRIPTION OF THE INVENTION

Figure 1:
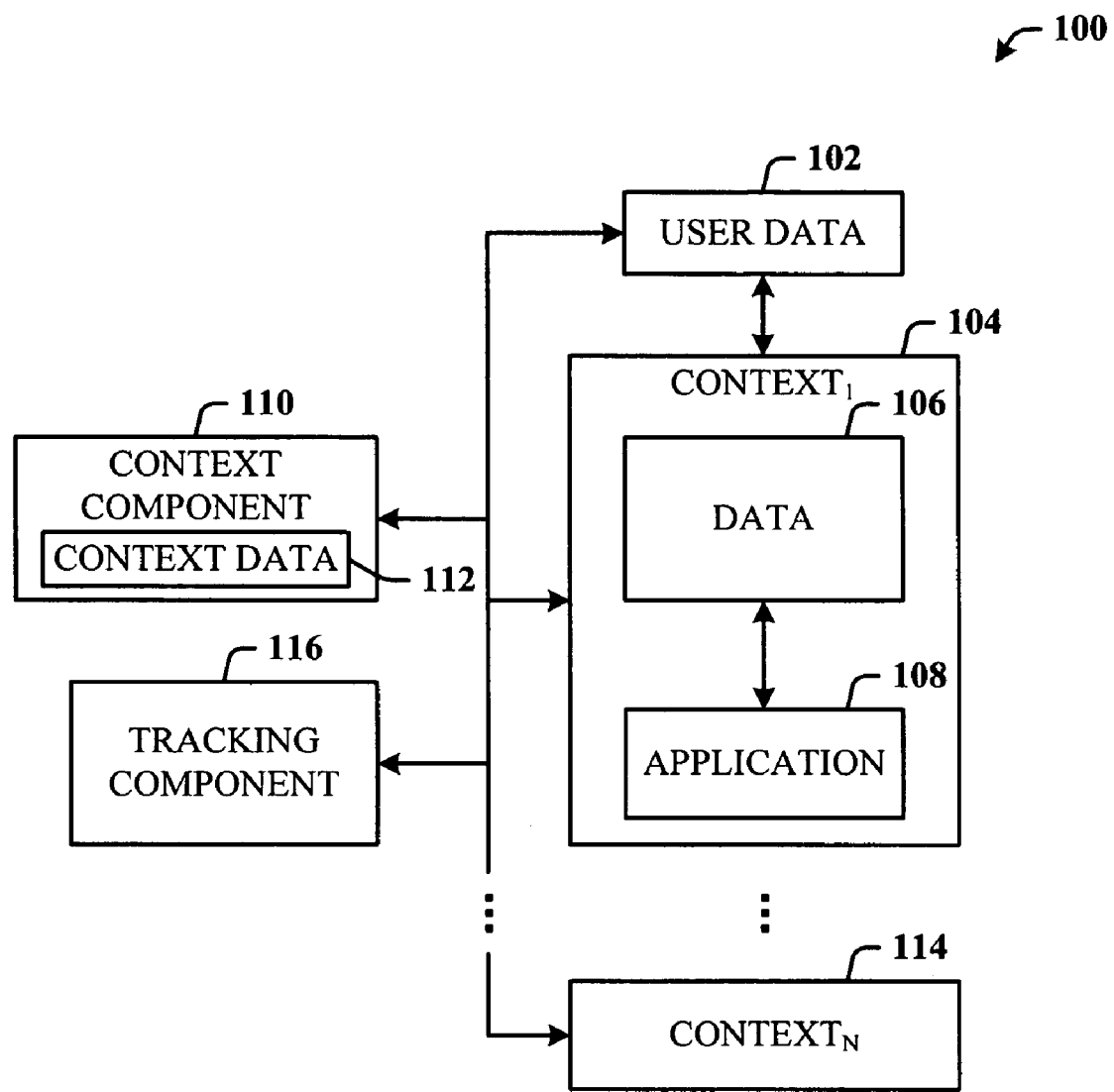
FIG. 1 illustrates a block diagram of a system that facilitates the management of data in accordance with the present invention.

The present invention is now described with reference to the drawings, wherein like reference numerals are used to refer to like elements throughout. In the following description, for purposes of explanation, numerous specific details are set forth in order to provide a thorough understanding of the present invention. It may be evident, however, that the present invention may be practiced without these specific details. In other instances, well-known structures and devices are shown in block diagram form in order to facilitate describing the present invention.

As used in this application, the terms "component" and "system" are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers.

As used herein, the term "inference" refers generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

Referring now to FIG. 1, there is illustrated a block diagram of a system 100 that facilitates the management of data in accordance with the present invention. The data management tool includes a novel architecture where the highest contextual assumption is that there exists an entity that consists of one or more users. The data management and storage model first assumes that data is associated with the user. Thus, data generated by an application employed by the user is associated with the user, groups of users, and topical content; and not simply with a folder, as in traditional systems.

In support thereof, when a user logs-in to the system 100, user data 102 is generated and associated with at least the user and the login process. The user automatically enters into a user workspace or a first context 104 (also denoted $CONTEXT_1$) or environment. This environment can be a default user workspace, or workspace environment predesignated by the user or an administrator after login, for example. After login, the user can perform data operations (e.g., create and manipulate) on a data 106 in any number of ways, including, but not limited to, viewing, editing, copying, moving, and deleting the data. Such data operations can be performed using at least one application 108. For example, where the data 106 is text data, a text editing or word processing application can be employed. Many different text editor and/or word processing applications exist that can be used to create, view, edit, copy, and move the data 106, to name just a few of the operations. Where the data 106 is program code, the application 108 is one that is suitable for providing user access and interaction therewith. Where the data 106 is a voice file, the application 108 can be an application suitable for playing the voice file. This all occurs in association with the first context 104.

The system 100 also includes a context component 110 in association with the first context 104 to monitor and generate context data 112 associated with data operations of the user in the first context 104. The context data 112 includes at least data representative of the user (e.g., some or all of the user data 102), data representative of the first context 104, data representative of the data 106, and data representative of the application 108. The context data 112 can be stored in the form of a table (or any other suitable data structure) for access and processing, and at any location, as desired.

The system 100 can include a plurality of the contexts, denoted as $CONTEXT_1, \ldots, CONTEXT_N$. Thus, in addition to the first context 104, there is at least a second context 114 with which the context component 110 is associated. This is because the user of the first context 104 can move to the second context 114, and perform many different data operations therein which will then be associated with that user in that second context 114. The data operations performed in the second context 114 are also associated with the user and stored automatically. Such user activities and data operations in the one or more contexts of the system 100 and movement of the user between contexts are tracked using a tracking component 116. Thus, data generated by applications is associated with an individual, group of individuals, and topical content; and not simply with a folder, as in traditional systems.

Figure 2:
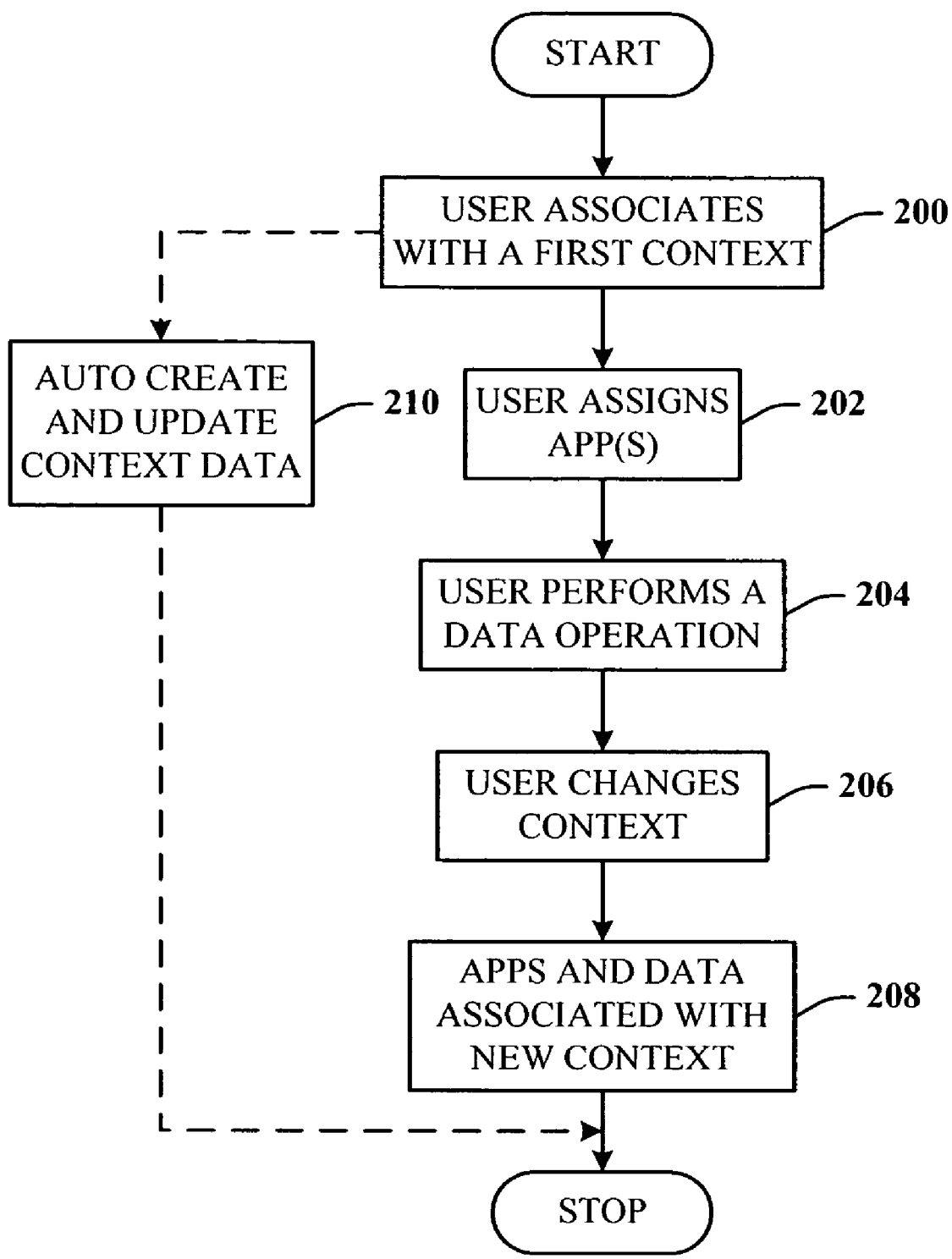
FIG. 2 illustrates a flow chart of a process of the present invention.

Referring now to FIG. 2, there is illustrated a flow chart of a process of the present invention. While, for purposes of simplicity of explanation, the one or more methodologies shown herein, e.g., in the form of a flow chart, are shown and described as a series of acts, it is to be understood and appreciated that the present invention is not limited by the order of acts, as some acts may, in accordance with the present invention, occur in a different order and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the present invention.

At 200, a user is associated with a first context. This can occur by the user logging in to a system and automatically entering a user workspace, which workspace is associated with the first context. At 202, the user assigns applications for use in the user context. This can occur explicitly by the user manually selecting the application(s) for association with the context, or implicitly by the user launching an application and performing data operations within the context. At 204, the user performs a data operation. At 206, the user changes context from the first context to a second context. At 208, the data and application(s) are then automatically associated with the second context. The process then reaches a Stop block.

As the user performs data operations in the first and second contexts, the system automatically creates and updates context data, as indicated at 210. This occurs transparently to the user, as indicated by the dashed line.

Referring now to FIG. 3, there is illustrated a system 300 employing a board 302 and a web 304 in accordance with the present invention. In the past, intuitive, dynamic, and changeable workflow processes have proved to be too dynamic and expensive for automation. Boards and webs are used to automate workflow processes and define relationships between data and applications. As users create and change their contexts, the data (e.g., files) and applications automatically follow, the shifts in context being captured dynamically in the context data. As used herein, a "board" is defined as a collection of data and application functionality related to a user-defined topic. For example, a user-defined topic may be a department of a company or a project that involves the company. In the case of a project, the board preferably includes all of the data relating to that project including email, tasks, calendar events, ideas, discussions, meetings, phone calls, files, contact records, people, etc. Data and applications may be grouped in a board based on the identity of the tag. As used herein, the term "web" refers to a collection of interrelated boards.

As implemented, the web 304 of the system 300 can include a plurality 306 of the boards 302 (also denoted as $BOARD_1$, $BOARD_2$, . . . , $BOARD_N$). The plurality of boards 306 can each be associated with a single user, one with a single user, and others with multiples users, including or not including the user. The system 300 can also employ a plurality of webs 308 (also denoted $WEB_1$, $WEB_2$, . . . , $WEB_X$). The many boards 306 can be grouped in different combinations as webs. For example, $BOARD_1$, and $BOARD_2$ can be grouped as $WEB_2$. Thus, where $WEB_1$ includes three boards all related to a single project, the boards 306 can include finance, accounting, and resources, for example.

Referring now to FIG. 4A, there is illustrated a diagram 400 of board relationships. Boards in a web may have, for example, a parent-child relationship, although this is not required. A given board can have more than one parent and more than one child. A board cannot be its own child or its own parent. However, boards can have various relationships to each other. For example, a board may be part of a circular relationship of any complexity. Illustrated herein, a first board, $BOARD_1$, is parent to a second board, $BOARD_2$. The second board, $BOARD_2$, is parent to a third board, $BOARD_3$, and $BOARD_3$ is parent to the first board, $BOARD_1$.

Referring now to FIG. 4B, there is illustrated board/web relationship diagram 402. Boards can exist in any number of webs. Many boards will exist in more than one web. The web represents a certain view of the relationships among boards. That is, the view can be hierarchical, or the view can be in the form of a work-flow. Additionally, the relationship between two boards on one web is independent of the relationship between those same two boards on other webs. As shown, in a first web, $WEB_1$, $BOARD_1$ is a parent to $BOARD_2$. Yet, in a second web, $WEB_2$, $BOARD_1$ is a child to $BOARD_2$. In a third web, $WEB_3$, $BOARD_1$ and $BOARD_2$ have no relationship, but exist independent of one another. In a fourth web, $WEB_4$, $BOARD_1$ exists, but $BOARD_2$ does not. These are but a few examples of the web/board relationships that can exist in accordance with the present invention.

In accordance with the invention, webs may be used to maintain the location of content within a complex and changing set of boards and support automation of a workflow process. One example of automation of a changing workflow process can be illustrated where the workflow process to be automated initially is represented by A→B→C, and ultimately changed to A→B/C→D. Three different groups of people are assigned to each item, where the resulting distribution is A(1, 2, 3)+B(4, 5, 6)+C(7, 8, 9).

In the known LDAP environment, it is necessary for the automation sequence to predetermine how work data flows from A to B and C. Then the automation module for inputs to D must be spelled out and rewritten to consolidate the split inputs from B and C. As such, the automation support for this workflow change will always lag behind the ability of the people involved to start working with the new workflow assumptions.

In contrast, and in accordance with the present invention, webs and boards are the context for applications, files, and folders. Hence, the workflow process may be readily reorganized by making a change to one or more of the webs and boards. By simply adding the board D and rearranging some of the relationships of A, B, and C, the workflow is quickly reorganized and implemented.

The disclosed system has associated therewith a routing algorithm, referred to herein as a "webslice." A webslice is a relationship rule that defines a relationship between a web and one or more boards of that web. If the web changes (e.g., a board is added), and meets the criteria of the rule, the content will be on the new board as well. For example, the rule can include a web ID, a starting board ID, and "transversal" data (i.e., the relationship rule), in the following format:

webslice (target board)=<webID; starting board ID; transversal data>.

Thus, if a system includes two webs, W1 and W2, where web W1 includes five boards: A (the starting board), B, C, D, and E, with each subsequent board a child to the previous board (i.e., B is child of A, C is child of B, etc.), the webslice data "slicing" to board E will be similar to the following:

webslice (board E)=<W1; board A; A→B→C→D→E>.

It is to be appreciated that where a child board has at least two parent boards, the webslice data can include at least two paths. For example, consider that A is the parent to both B and C, with B and C the parents to D. A webslice to D can be obtained in one of two ways:

webslice (board D)=<W1; board A; A→B→D>, or
webslice (board D)=<W1; board A; A→C→D>.

Moreover, since the webslice to a given board of a web can take at least two different paths, one path can be longer than the other to the desired board. Consider that A is the parent to both B and C, with B the parent to D, and C the parent to E, and E the parent to D. A webslice to D can be obtained in one of two ways:

webslice (board D)=<W1; board A; A→B→D>, or
webslice (board D)=<W1; board A; A→C→E→D>.

These examples are only but a few of the relationships that can be extracted using a webslice. The webslice can also take the forms of the following: "Just the board I started from" (a default); "All child boards"; "All sibling boards"; and, "All descendant boards", for example.

Thus, by using at least these three basic entities for the webslice (i.e., the web ID, the starting board ID, and the transversal data), the boards associated with a given content can be ascertained. Since content is associated with context, and the board is used in part to define the context, the system knows the content associations whereupon a change of web structure, the system knows with which board(s) the content is associated, both before and after the structure change. In keeping with one aspect of the invention, the location of the content may be determined dynamically at runtime using the webslice. Alternatively, the associated location of content may be determined by detecting changes in structure, detecting the temporary location of the content on the boards in the routing algorithm before and after the change, and adjusting the location of the affected content as part of the change in structure. Of course, the webslice data is not limited to the three aspects indicated hereinabove, but may include further information, such as at least one application ID and user ID (that uniquely identifies the creator of the content), for example.

Data created while the user is in the board is immediately associated with the user, the current workspace, any other desired workspace that the user designates, and the application. This association is captured in a form of metadata and tagged to the data being created. The metadata automatically captures the context in which the data was created as the data is being created. Additionally, the data content is indexed to facilitate searching for the content in number of different ways in the future by the user or other users. This tagging process is universal, in that, the data model allows for any binary data (e.g., files), as well as any set of definable data to be accepted into the system. The system is not restricted to processing e-mail, faxes, calendar events, meetings, phone calls, etc., that are included in the bundled system, but can also accommodate whatever data the user chooses to define. The system is also universal insofar as user interaction can be through a browser that is pervasively employed for use with conventional operating systems.

Figure 5:
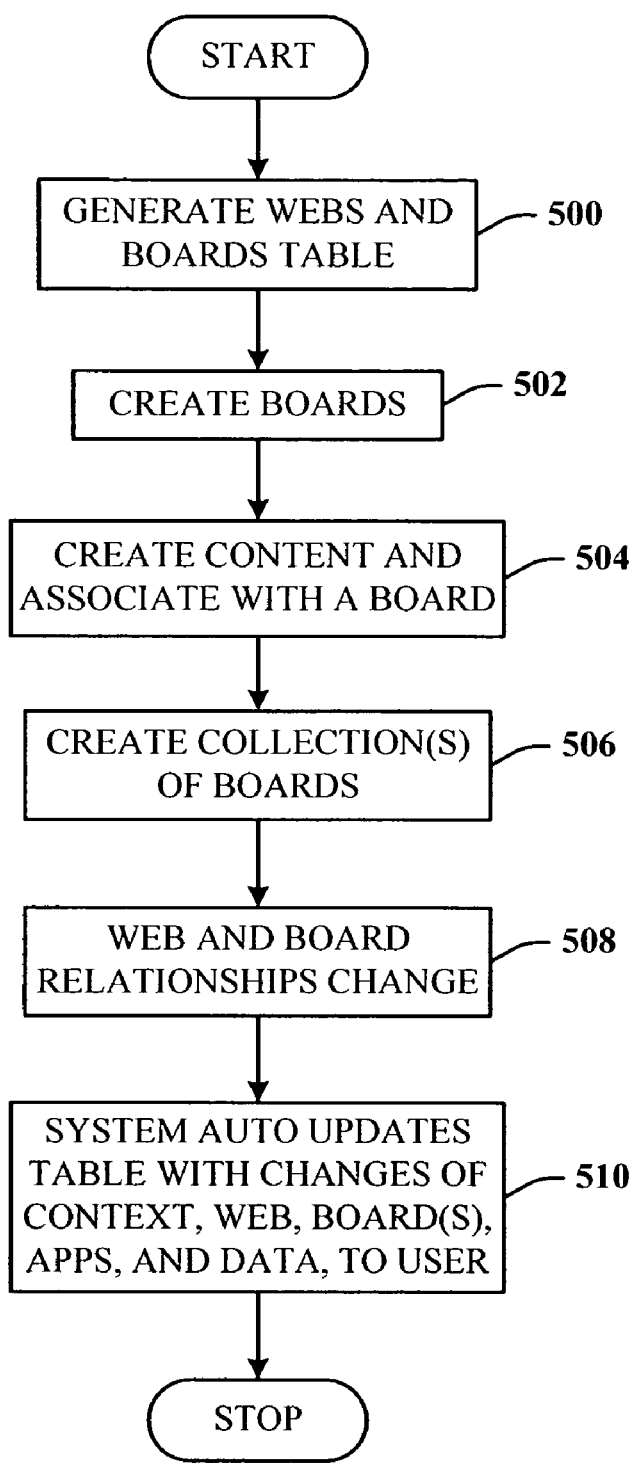
FIG. 5 illustrates a flow chart of a process for board and web generation in accordance with the present invention.

Referring now to FIG. 5, there is illustrated a flow chart of a process for board and web generation in accordance with the present invention. At 500, a webs-and-boards table is created to track the relationship of said aspects. At 502, a user creates a board. This can be via an administrator initially configuring a person's user workspace, or thereafter, a user creating another workspace, for example, a shared workspace. At 504, the user performs data operations while in the board. The data and applications employed to operate on the data are then included as content associated with the user in this particular context. Given that there can be multiple users, there can be a corresponding one or more webs associated with the one or more users. A BOARD(S) column lists the number of boards, and select numbers of the boards can now be grouped in collections or webs, as indicated at 506, to facilitate workflow, for example. For any number of reasons, the web and board relationships can be changed, as indicated at 508. At 510, the webs-and-boards table is automatically updated as these changes occur. The process then reaches a Stop block.

Figures 6, 7:
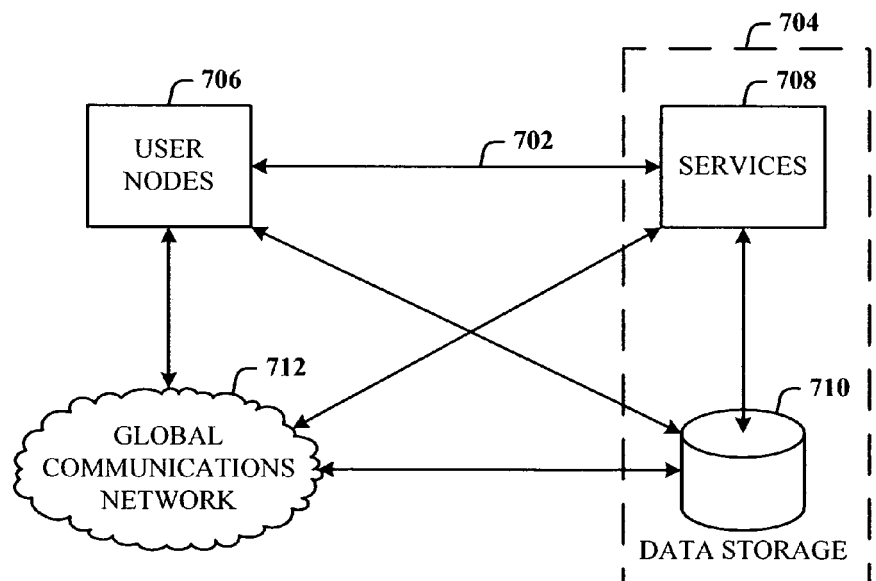
FIG. 6 illustrates a sample webs-and-boards table used in accordance with the present invention.
FIG. 7 illustrates a block diagram of system in accordance with the present invention.

Referring now to FIG. 6, there is illustrated a sample webs-and-boards table 600 used in accordance with the present invention. The table 600 includes a user information column related to a number of users (1–3 and 6–8), under the heading of USER(S). This is because the novel invention first begins by associating all aspects with the user. The table 600 also includes a WEB(S) column that associates one or more webs (W1, W2, and W3) with the one or more users. A BOARD(S) column lists the lists the boards (e.g., B11, B12, and B14) with a given web. Here the users 1, 2 and 3 are associated with a web W1 that comprises a collection boards B11, B12, and B14 (where the first digit is the associated web number, and the second digit is the board number). The table 600 also includes a parent/child relationships column (denoted as BOARD(S) P/C RELATION). Here, board B11 is the parent, and board B12 is a child, and a parent to board B14. The table 600 is not limited to the columns provided, but can include more information, as desired.

Referring now to FIG. 7, there is illustrated a block diagram of system 700 in accordance with the present invention. Generally, the system 700 includes an internal network 702 on which is disposed a services system 704 and one or more users 706 seeking use of the services system 704. The services system 704 further includes a services component 708 and an associated data storage system 710 for storing data and programs. The services system 704 includes the data management tool of the present invention.

A user at one of the user nodes 706 can access the services system 704 via a browser over a wired/wireless communication link. Given that a browser is a principal means for access, the user node can be any type of computing device and operating system that supports a browser, whether the browser is a full-blown program typically used on a desktop computing system, or a modified or slimmed down browser interface employed in a portable computing device, e.g., a personal data assistant (PDA), wireless computing tablet, and cellular/digital telephone. As illustrated, the user nodes 706 also have direct access to the data storage system 710.

The user nodes 706 can also access a global communications network 712, e.g., the Internet, using conventional communication means, thereby providing a second path for accessing the services system 704, that further facilitates direct access to the services 708 and/or the storage system 710. This second path is most important, since a user can access the system 704 from essentially anywhere.

The services system 704 can be utilized internal to a corporate environment operating on, for example, an intranet, and providing such services only to corporate users. In another implementation, the system 704 can be disposed external to the corporate environment such that the company subscribes to the system services via a vendor.

Figure 8:
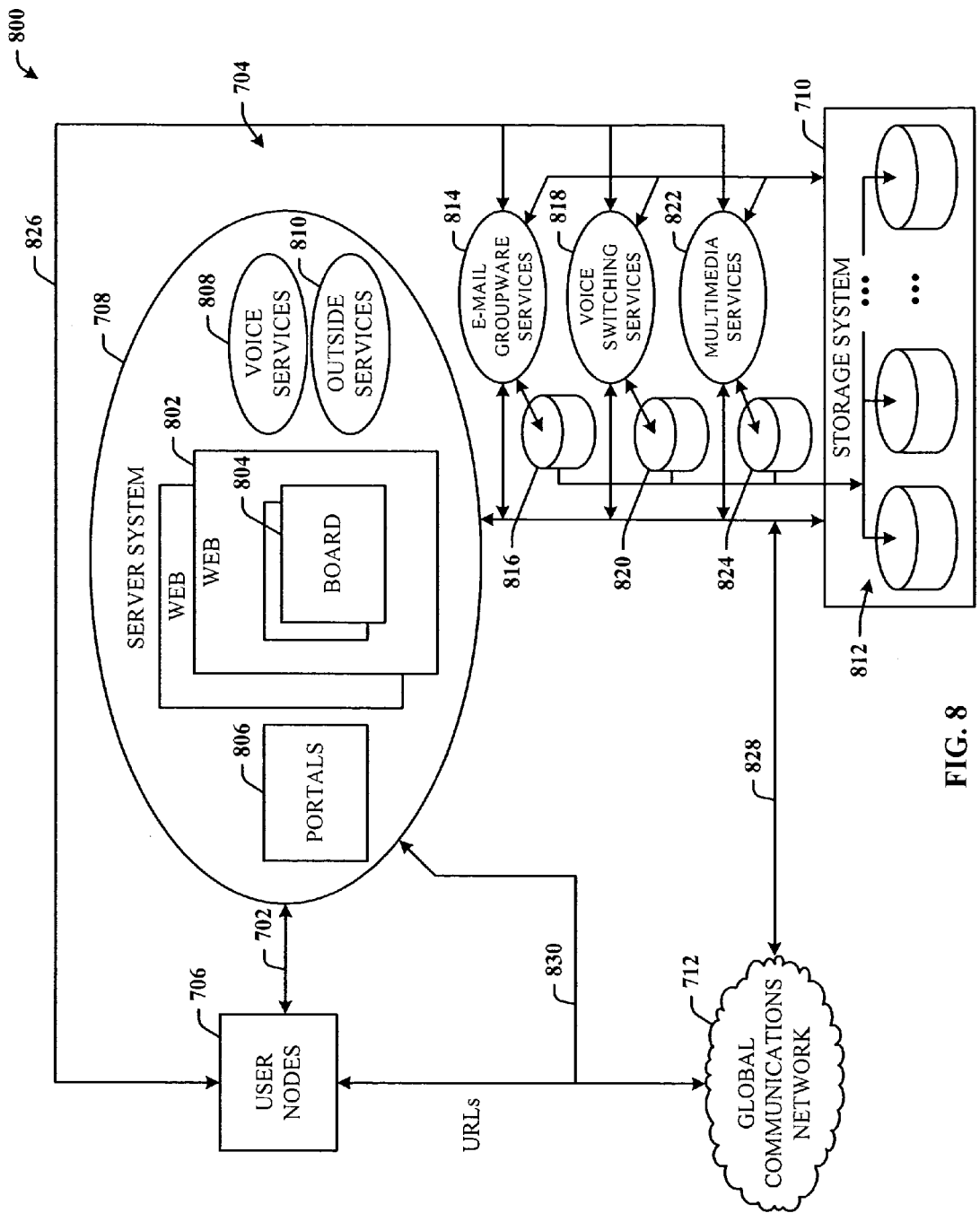
FIG. 8 illustrates a more detailed block diagram of a system of the present invention.

Referring now to FIG. 8, there is illustrated a more detailed block diagram of a system 800 of the present invention. The system 800 includes the internal network 702 on which is disposed the services system 704 and the one or more users 706 seeking use of the services of the services component 708 provided thereby. The services of the services component 708 facilitate the use of the data management tool, which employs one or more webs 802 and boards 804. The tool further provides portal services 806 for accessing the services from various internal and external network locations using the TCP/IP suite of protocols. Other services provided include, but are not limited to, voice services 808 and outside services 810. Outside services 810 facilitate including non-employees and the use of third-party applications in specific projects in the system by providing various levels of access to any number of data locations and services. Read/write permissions can be granularized to the file level, if desired.

The data storage system 710 includes a number of storage methodologies 812 for handling and processing data. For example, one methodology enables large numbers of users to organize files and documents around many projects simultaneously. Data of any kind and size can be uploaded to a common shared workspace or board. Varying levels of access can be provided to the uploaded data. Other methodologies are associated with storing the data, archiving the data, data warehousing, library data, and an idea registry for tracking that aspect of the companies intellectual capital. The storage system 710 facilitates the storage and access of metadata libraries that link hierarchical and non-hierarchical LDAP folders.

As indicated hereinabove, the management tool operates seamlessly with existing computing system applications, and existing system services. For example, the conventional system services can include at least the following: e-mail, collaboration and groupware services 814 having an associated e-mail, collaboration and groupware storage system 816, voice switching services 818 (e.g., telephone and paging functions) having an associated voice data storage system 820; and multimedia services 822 having an associated multimedia storage system 824. The storage systems 816, 820, and 824 can connect to the storage system 710 to facilitate data transfer and storage in accordance with the various methodologies of the storage system 710.

A user of the users node 706 can also access the e-mail/collaboration/groupware services 814, voice switching services 818, and multimedia services 822 indirectly through the services system 704 using a multi-user data manipulation engine, e.g., OLAP (On-Line Analytical Processing). Alternatively, the user can access these services 814, 818, and 822 directly over the network 702, but shown separately as a communication link 826, and through the services 708 without using the multi-user engine.

The user can also access the services 704, other services 814, 818, and 822, and data storage system 710 over the global communications network 712 via a link 828. This is facilitated through the user browser by directing the browser to a website using a URL (Uniform Resource Locater) or through an alternative Link 830.

The management tool is browser-based and incorporates a strong-encryption scheme (e.g., using 128-bit SSL (secure socket layer) protocol). This means that data transmitted between the user computer and the services server is substantially secure. Furthermore, data shall not be cached, which means that there is no information footprint left on the user computer after the user logs off. The user can access data securely from virtually any network node using any type of browser. The data is stored encrypted on the storage system 710.

Figure 9:
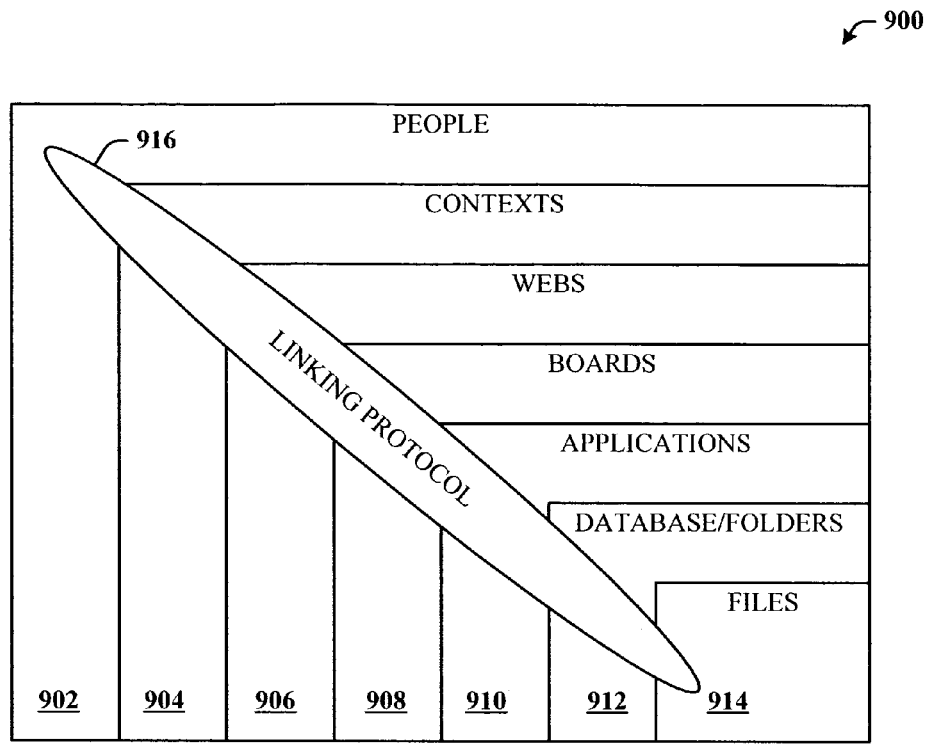
FIG. 9 illustrates a diagram of a general structure of the management tool system.

Referring now to FIG. 9, there is illustrated a diagram of a general structure of the management tool system 900. The structure starts at a high level with the user at a user level 902. The user level 902 is next associated with a context level 904 that defines all contexts in which the user can be included. Under the context level 904 is a web level 906 that associates one or more of the webs with one or more of the contexts of the context level 904. A boards level 908 underlies the webs level 906 and provides associations of the many boards with one or more of the webs. An applications level 910 facilitates associating one or more applications with a board designated at the board level 908. A database/folders level 912 underlies the applications level 910, and facilitates storing at least data, tables, and context information generated from the upper levels in folders, in the form of, e.g., files, at an associated underlying file level 914. A linking protocol 916 provides cross-level communication for facilitating all aspects of data processing and communication at all levels of the data management system 900.

Figure 10:
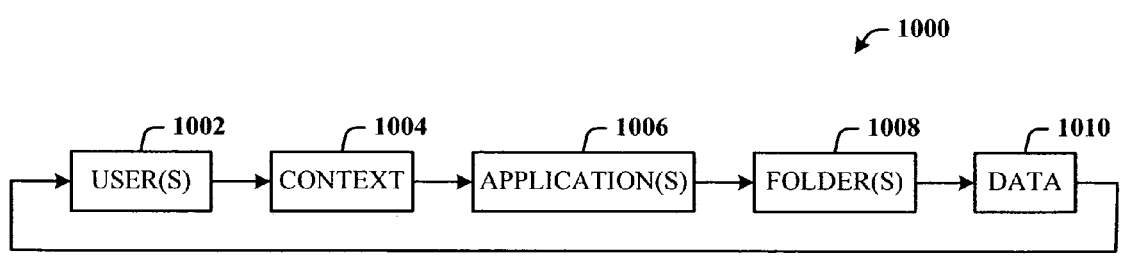
FIG. 10 illustrates a level flow diagram of the hierarchy of the present invention for associating one or more users, context, applications, and folders with data.

Referring now to FIG. 10, there is a level flow diagram 1000 illustrating the hierarchy of the present invention for associating one or more users 1002, context 1004, applications 1006, and folders 1008 with data 1010. The approach is for file storage pointers of an application to be dynamic, governed initially by the folder within which the application is launched. Additionally, the file storage pointers are then accessible and acted upon by the same application from any folder in the system. This is a dynamic non-linear implementation.

Traditional collaborative technologies, like groupware, allow groups of users to take action on the same file substantially simultaneously. However, in preparation for such capabilities, all users must have compatible versions of the same application that is to be used for working with the file. The context for any folder is limited to a one-to-many and many-to-one relationship. Essentially, the folder possesses a singular context to the directory tree in which it resides.

In contrast, the disclosed architecture assumes that the highest contextual level is that of an entity consisting of a group of users forming a many-to-many architecture. The users create and use the files within the context of the workspaces or boards of one or more users, which may or may not have web relationships. In this implementation, the board is similar in function to a folder in conventional LDAP systems.

The user then uses a suite of applications within a board, with any file created being immediately associated with the user, that board, any other board desired, and the application. In other words, by the person doing simply his/her work, an enormous amount of metadata about the context(s) for that work is captured automatically. Additionally, the system indexes the content to facilitate the other ways in which the users of the system might want to search on that file in the future—ways and future contexts which are not and cannot be known by the users in advance and certainly are not facilitated by conventional systems.

The system facilitates the use of an array of applications that act independently of the boards from which they were launched, and those boards are capable of being ordered in a myriad of collections of relationships (i.e., webs). The applications can traverse the webs to the boards associated with the information.

In addition to a macro view obtained by webs and boards, the user can also create familiar hierarchical folders within any board. These are virtual folders, in that their storage is governed by the process described above. No data is physically stored in these folders. Finally, any file or group of files can be associated with any other file in the system, allowing the users of the system infinite flexibility in determining dynamic associations among the macro/micro components of the system.

Figure 11:
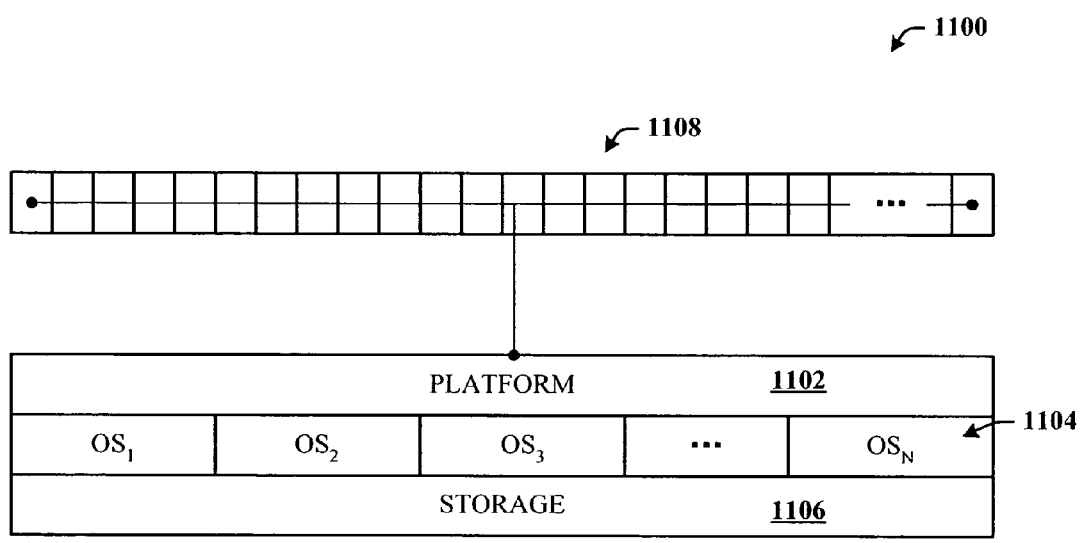
FIG. 11 illustrates a system operational in accordance with the present invention.

Referring now to FIG. 11, there is illustrated a system 1100 operational in accordance with the present invention. The system 1100 includes a data management platform 1102 suitable for accommodating any number conventional operating systems (OS) 1104 (also denoted $OS_1, OS_2, OS_3, \ldots, OS_N$). The system 1100 also facilitates the use of a single data storage system 1106 suitable for use with any of the operating systems 1104, whereas conventionally, a given OS may require a certain data storage file structure. The platform 1102 is OS-independent, and provides a single point of contact for multiple users and resources 1108.

Figure 12:
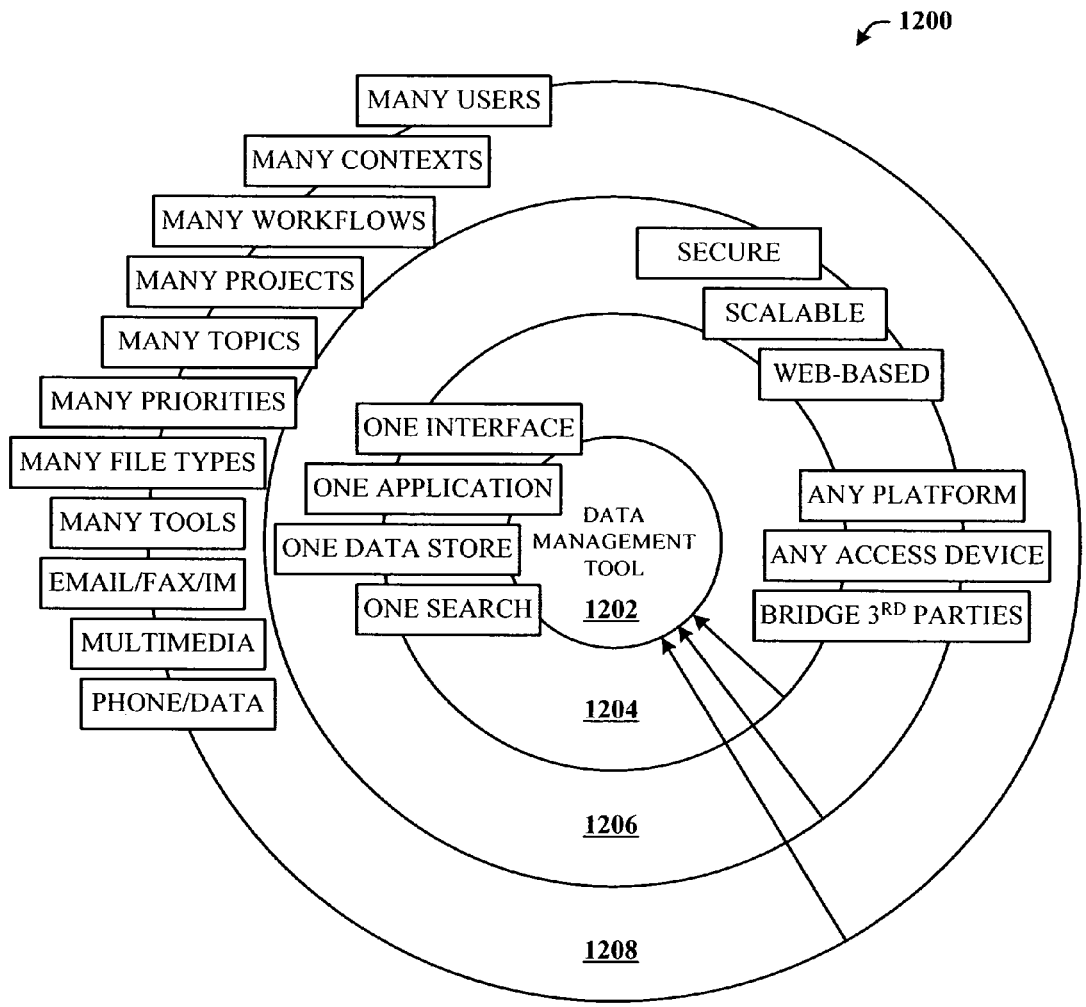
FIG. 12 illustrates a design integration chart of the disclosed invention.

Referring now to FIG. 12, there is illustrated a design integration chart 1200 of the disclosed invention. At the core of the system is a data management tool 1202 that facilitates all of the outlying features and capabilities. The tool 1202 facilitates, at a second layer 1204, one interface (via a browser), one application (the tool itself), one data store (associate with the management tool), and one search mechanism for finding any data element of the data store. Of course, any third party applications typically have their own search tool to search for files and folders that may also be used. At a third layer 1206, the system 1200 facilitates a secure operating environment, a scalable environment, and web-based. Moreover, the system 1200 can be implemented on any software and/or hardware platform, accommodate access from any device, and bridge to third party applications and devices. At an outer layer 1208, the system 1200 facilitates one or more instances of the following: users, contexts, workflows, projects, user-defined topics, priorities, file types, and tools. The system 1200 also is suitable for use with e-mail, facsimile, and instant messaging subsystems, multimedia services, and voice systems (e.g., phone and paging data).

The system 1200 captures and catalogs data automatically. Users, projects, permissions and communication tools can be readily configured, along with the exchange of voice information, data, and video data, seamlessly. As users collaborate, the system 1200 captures context information, and automatically records when and how data is shared, who updated the data, how often the data was accessed, what additional information the data was linked to, etc. Meeting information can be stored automatically, including, but not limited to, who attended, the documents shared, instant messages captured, handouts used, slides presented, etc. A later search can retrieve this information along with the context(s) within which the data was generated and used.

The system 1200 enables larger numbers of users to organize communications around many projects substantially simultaneously. It can relate those projects to one another using whatever workflow model(s) are required, and dynamically assign modular communications tools (e.g., e-mail, voice mail, fax, teleconferencing, document sharing, etc.) to those many projects as desired. The system 1200 automatically indexes that information within the context(s) in which it is received and used. This way, when a user searches the system 1200 for information, the user not only gets the information sought, but also can see how the information is currently being used by other users and project groups in the whole system. Traditionally, if a document was to be associated with seven different projects, for example, the document would be stored in seven different file locations and version control could be a significant problem. In accordance with the present invention, the document is seamlessly linked to all seven projects. Thus, only one version exists, and version control is much easier to address.

The disclosed system architecture is suited to relational and object database structures for use on a large scale. The data management tool uses both relational and object storage approaches to facilitate at least Internet-based data communications.

Figure 13:
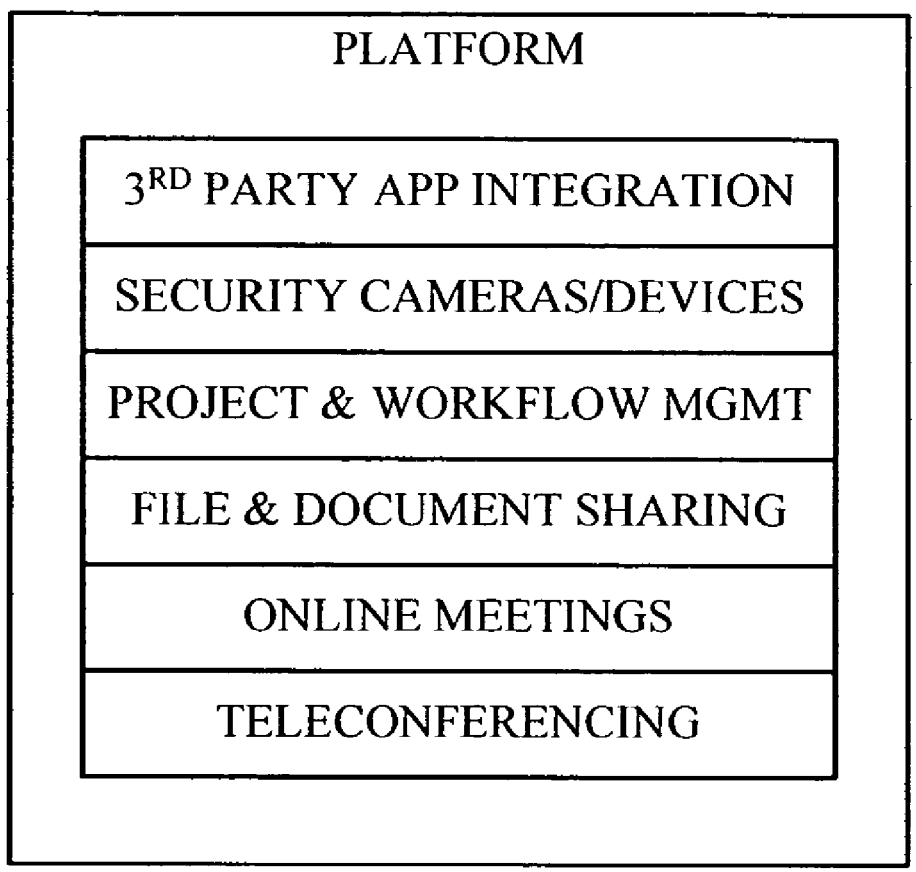
FIG. 13 illustrates one implementation of a platform system accordance with the present invention.

Referring now to FIG. 13, there is illustrated one implementation of a platform system 1300 in accordance with the present invention. The platform system 1300 includes the capability of third-party application integration, security cameras and other devices for data input, project and workflow management and, file and document sharing. The platform system 1300 also accommodates online meetings between logged-in users, and teleconferencing between the users, if desired. The teleconferencing can be initiated using the platform system 1300.

Figure 14:
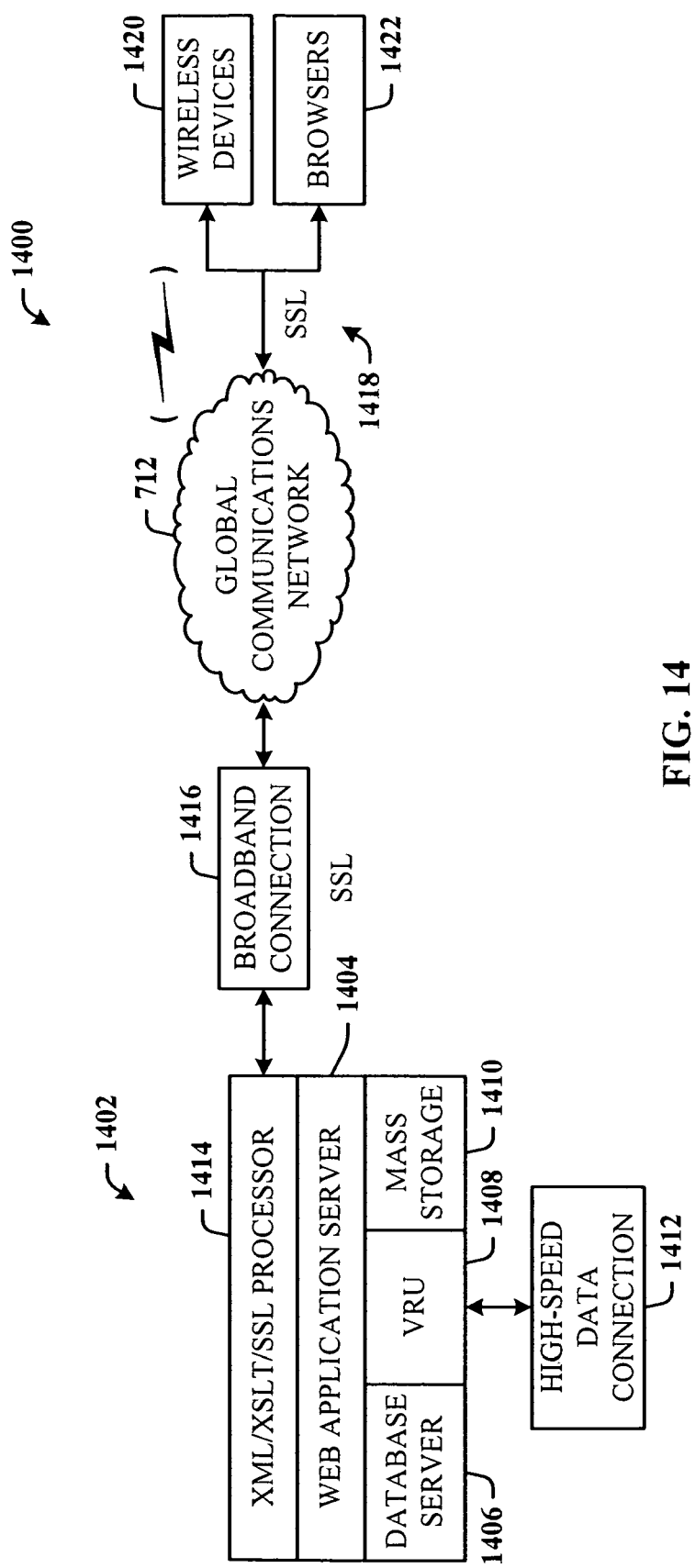
FIG. 14 illustrates a general system configuration of the present invention.

Referring now to FIG. 14, there is illustrated a general system configuration 1400 of the present invention. The system 1400 includes a platform 1402 that hosts at least the data management tool, here called a web application server 1404. The server 1404 provides a common layer to underlying services that include a database server 1406, a VRU (voice response unit) 1408 (also called an interactive VRU or IVRU) and mass storage system 1410. The VRU 1408 facilitates interactive calling features for a user via remote touchtone signals and to voice data to the caller such that the caller can make choices in response to predetermined options presented by the system.

The platform 1402 can utilize at least one multi-channel data communication connection 1412 (e.g., T1, DS3) into the VRU subsystem 1408 for communicating voice information and interacting with features of the platform 1402. As indicated previously, the invention can accommodate user communication from virtually any accessible network node. To facilitate such an interface, the platform 1402 can include a processor 1414 suitable for XML (eXtensible Markup Language), XSLT (XML Stylesheet Language: Transformations), and SSL processing. The processor 1414 can also access web-based services utilizing SOAP (Simple Object Access Protocol). SOAP employs XML syntax to send text commands across the network using HTTP (HyperText Transport Protocol). Thus, there is a high-speed connection 1416 (e.g., broadband) that interfaces to the processor layer 1414 for use with multiple communication exchanges with remote users disposed on the global communication network 712. The remote users can access the platform system 1402 via a SSL connection 1418 using portable wired/wireless devices 1420, and by way of the associated browsers 1422.

Figure 15:
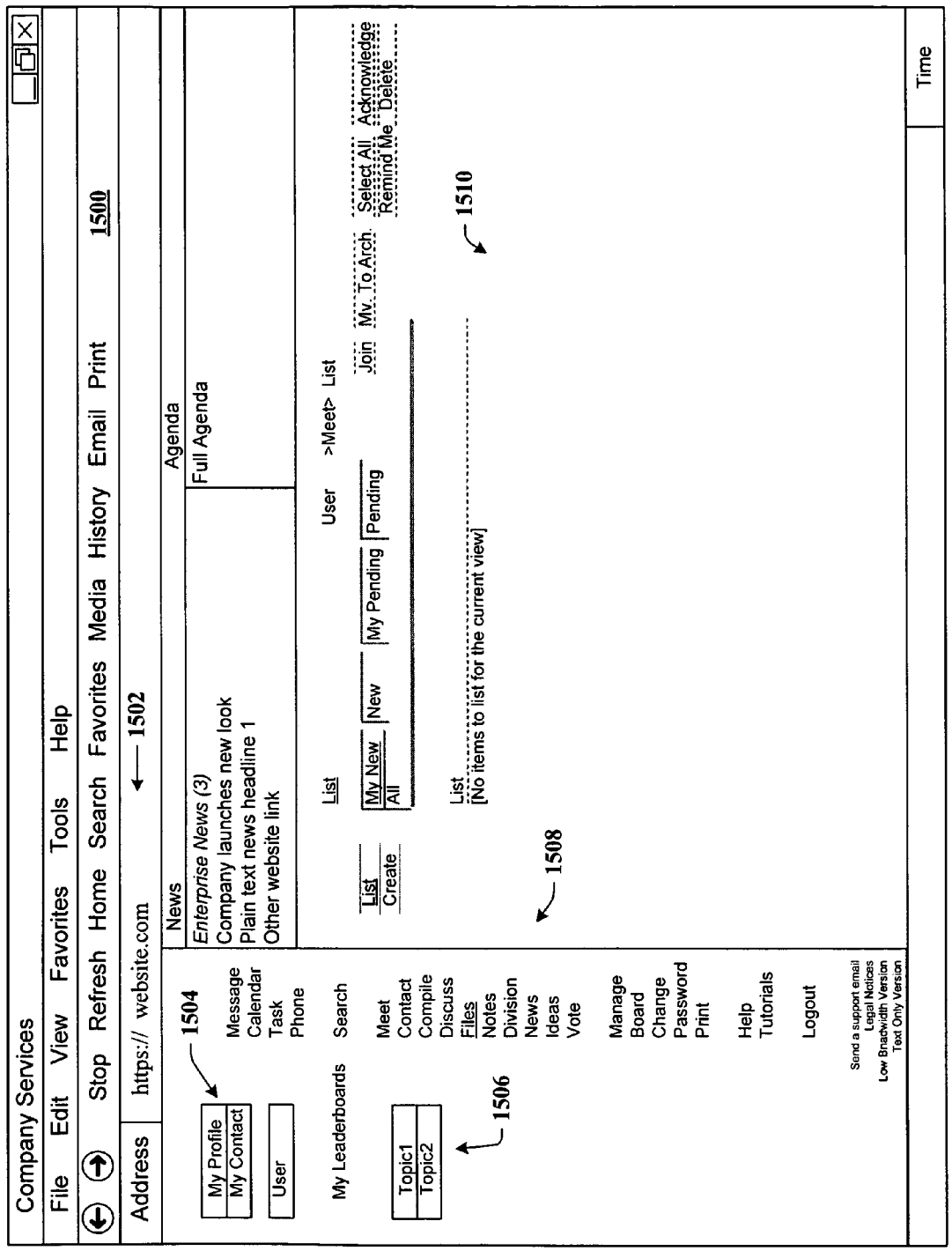
FIG. 15 illustrates a screenshot of a management tool window of a browser used as a user interface to facilitate user interaction with meeting information in accordance with the present invention.

Referring now to FIG. 15, there is illustrated a screenshot of a management tool window 1500 of a browser (e.g., Internet Explorer by Microsoft Corporation) used as a user interface to facilitate user interaction with meeting information in accordance with the present invention. The window 1500 includes an address field 1502 that indicates the default protocol and URL address for accessing the data management system of the present invention. Here, HTTP is used to access the server via network. The "https:" indicates the connection will be to a secure port instead of a default web port. The window 1500 also includes a user area 1504 that indicates the name of the user logged into the system. There is also provided a topic area 1506 that lists the various boards associated with the user-defined topics. Here, the user has defined two topics: a Topic 1 and a Topic 2.

The window 1500 also includes an application (or services) area 1508 that lists many applications selectable by the user while in this particulate window 1500. The applications presented to the user from this window 1500 include but are not limited to the following: Message, Calendar, Task, Phone, Search, Meet, Contact, Compile, Discuss, Files, Notes, Division, News, Ideas, Vote, Manage Board, Change, Password, Print, Help, Tutorial, and Logout. Depending on the user permissions provided by an administrator, the user may see more or fewer applications.

Here, the Meet application option is selected to allow user interaction with setting up a meeting related to projects of the user. The Meet application option further includes List and Create sub-options. When the List sub-option is selected, a center viewing area 1510 is used to present board, context, web address and other information so that the user can review the existing board and context information related to setting up a meeting. Selection the Create sub-option allows the user to create a meeting in association with one or more of the boards and make changes to existing board relationships and contexts. Other user-selectable options are provided such that the user can Join in a session with one or more other users, Move data to Archive, Select all objects, set a Reminder for himself or herself, and Delete boards.

The Messaging option allows the user to give out an e-mail address of a project work area, enabling senders to send the messages to right place. Thus, the user no longer needs to manually move the messages to the appropriate folders once received in a personal message inbox. Additionally, incoming faxes are routed to the appropriate board for storage and review. Keywords and phrases in the fax are automatically indexed. Later retrieval is accommodated simply by performing a search for the keywords or phrases. Moreover, a given board can be assigned a fax number. Thus, all faxes coming in can be routed to that number, and on to the associated board.

The Vote option allows the company and organizations to communicate and gather opinions by way of voting. A question can be entered, and the users selected to whom the question(s) should be posed.

Figure 16:
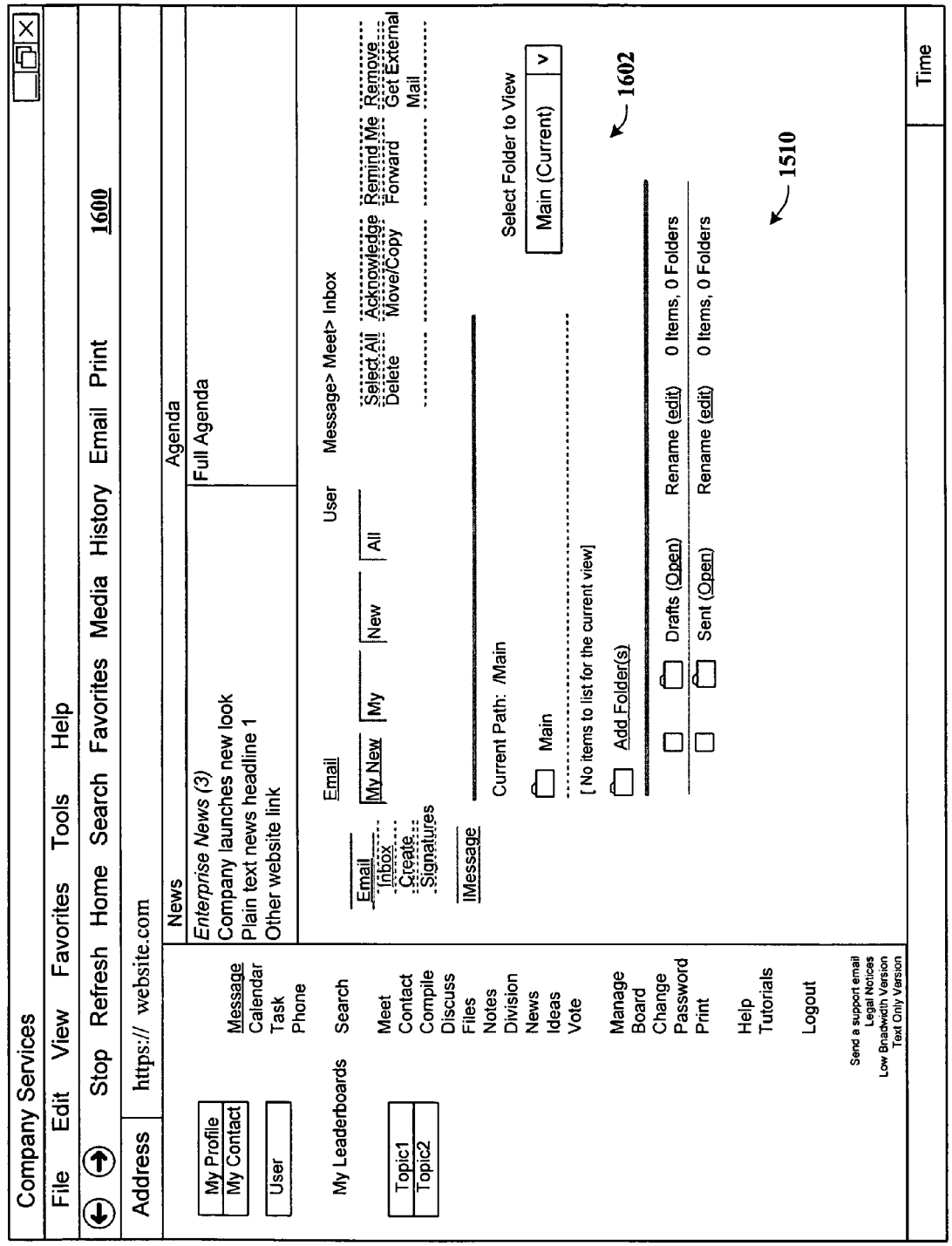
FIG. 16 illustrates a screenshot of a management tool window of a browser used as a user interface to facilitate user interaction with e-mail information in accordance with the present invention.

Referring now to FIG. 16, there is illustrated a screenshot of a management tool window 1600 of a browser used as a user interface to facilitate user interaction with unified messaging, including e-mail, voice mail and fax information in accordance with the present invention. The window 1600 includes many of the same fields and informational areas of the previous windows (e.g., areas 1502, 1504, 1506, and 1508 of window 1500 of FIG. 15). Here, the Message option is selected to allow user interaction with various forms of messaging support by the disclosed management architecture. The Message option further includes an instant messaging (IMessage) sub-option, in this particular implementation.

When the Email-Inbox sub-option is selected, the center viewing area 1510 is used to present the user's messaging inbox folders. The user can then open these folders to view the e-mail, voice mail and fax messages stored therein. The center viewing area 1510 also includes a drop-down menu 1602 that allows the user to select from a variety of different folders (e.g., Main, Drafts) of the e-mail system. The user can also create and sign messages with a digital signature.

As before, other user-selectable options are provided such that the user can manipulate messaging information, including, but not limited to, Select All, Delete, Acknowledge, Remind Me, Remove, Move/Copy, Forward, and Get External Mail.

There is also provided a News link that allows the user to link to the latest corporate and/or division news.

Figure 17:
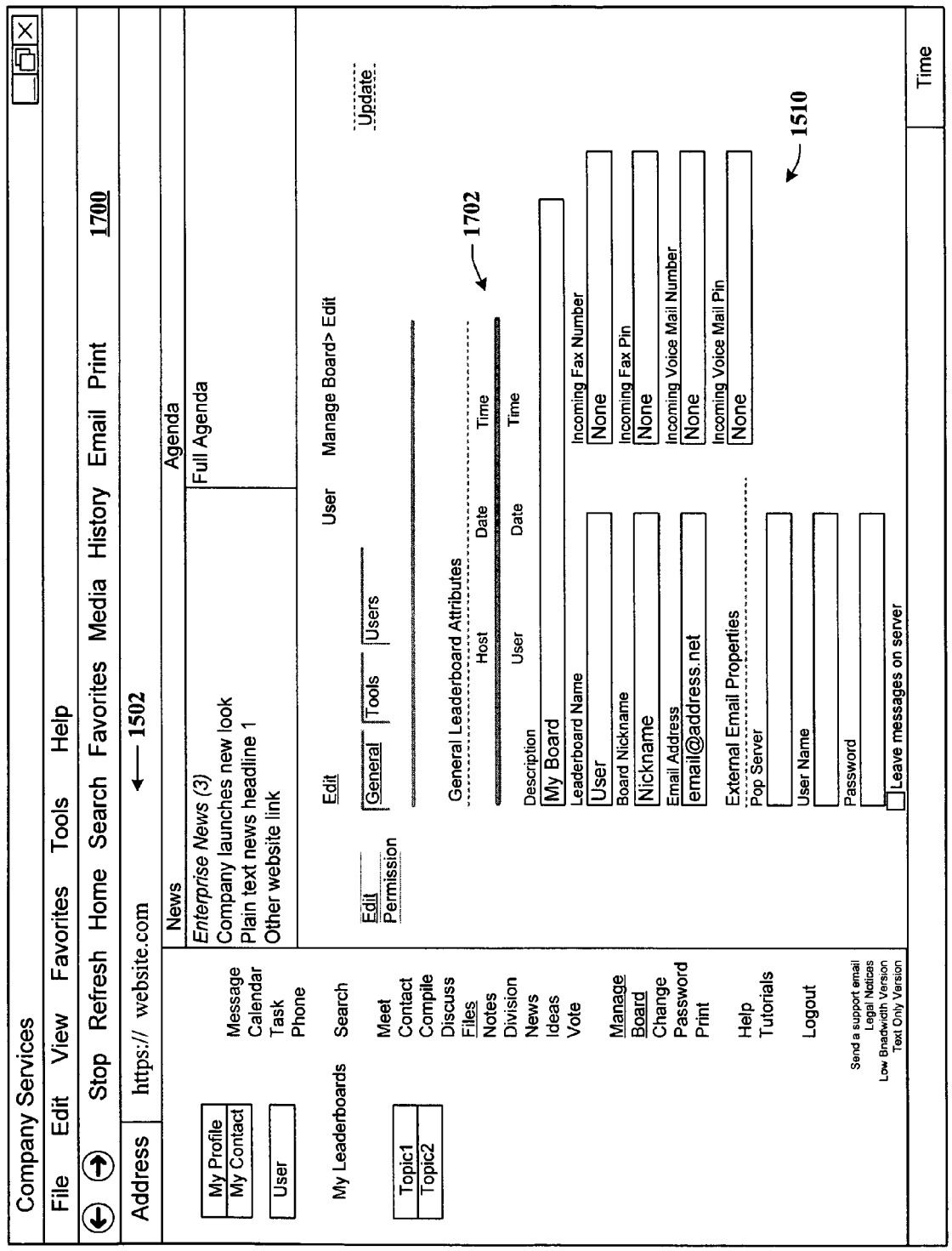
FIG. 17 illustrates a screenshot of a management tool window of a browser used as a user interface to facilitate user interaction with a board management option in accordance with the present invention.

Referring now to FIG. 17, there is illustrated a screenshot of a management tool window 1700 of a browser used as a user interface to facilitate user interaction with a board management option in accordance with the present invention. The window 1700 includes many of the same fields and informational areas of the previous windows (e.g., areas 1502, 1504, 1506, and 1508 of window 1500 of FIG. 15). Here, the Manage Board option is selected to allow user interaction with various forms of user management of boards. The associated sub-options allow the user to Edit the board attributes, and set permission levels thereto, in this particular implementation. Of course, many different additional or different options can be provided (in this window and other windows), at the discretion of the administrator. The system allows for new attributes to be added to this option as the need arises.

The center viewing area 1510 presents general board attributes 1702 of the user (e.g., user name, data, and time), and several fields for entering user information, including in this implementation, but not limited to, board description, board name, board nickname, board e-mail address, external e-mail properties (e.g., POP server, user name, and password), fax information (e.g., incoming fax number for the board and incoming fax PIN), and voice mail information (e.g., incoming voice mail number and incoming voice mail PIN).

Figure 18:
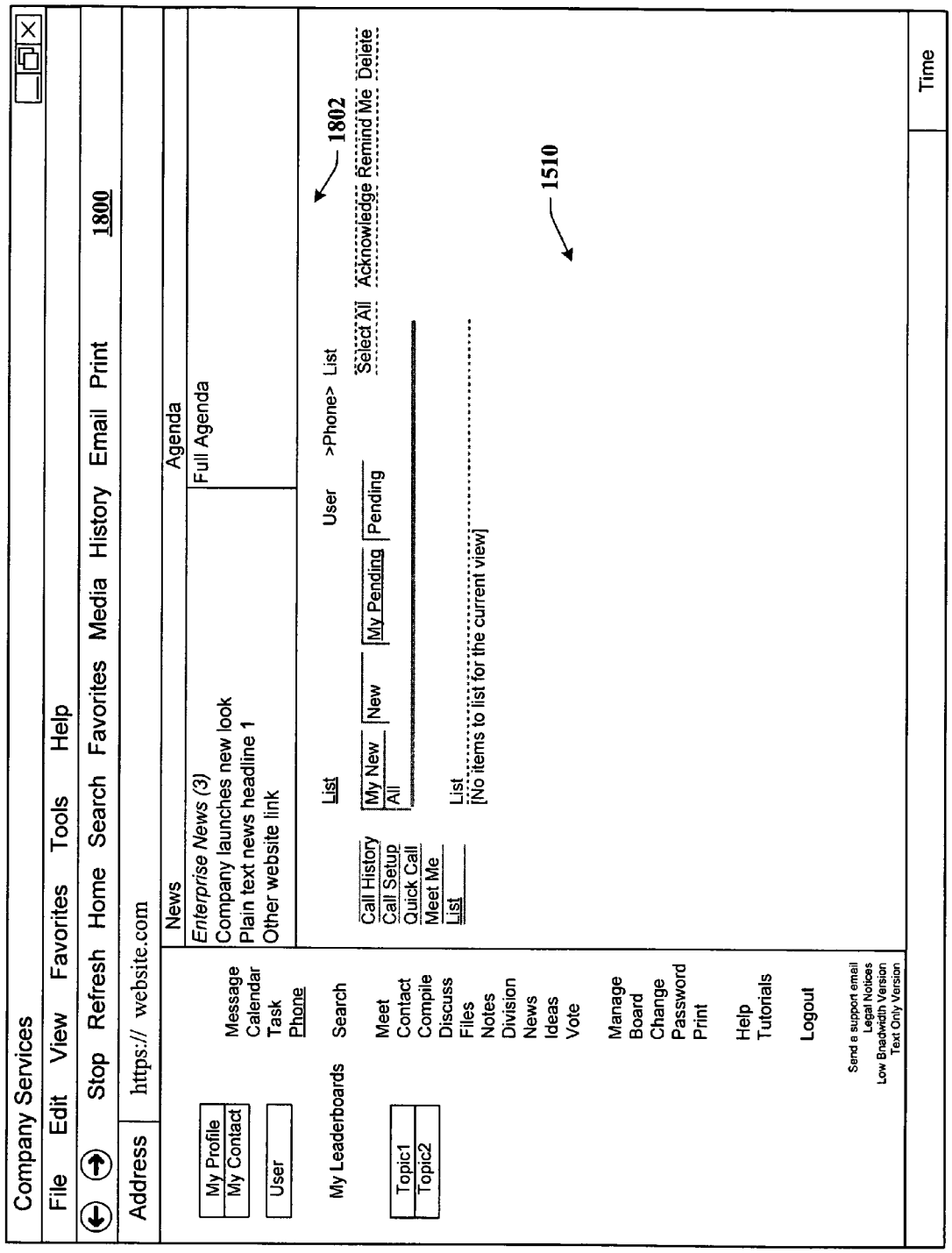
FIG. 18 illustrates a screenshot of a management tool window of a browser used as a user interface to facilitate user interaction with a phone option in accordance with the present invention.

Referring now to FIG. 18, there is illustrated a screenshot of a management tool window 1800 of a browser used as a user interface to facilitate user interaction with a phone option in accordance with the present invention. The window 1800 includes many of the same fields and informational areas of the previous windows (e.g., areas 1502, 1504, 1506, and 1508 of window 1500 of FIG. 15). The sub-options include Call History, Call Setup, Quick Call, Meet Me, and List. The central viewing area 1510 for this window 1800 simply includes a listing of phone-related events for the given user.

As before, other user-selectable options are provided such that the user can manipulate phone information, including, but not limited to, Select All, Delete, Acknowledge, and Remind Me. In addition, as with the other windows, there is include an Agenda area 1802 for presenting any agenda information of a meeting or upcoming event.

Figure 19:
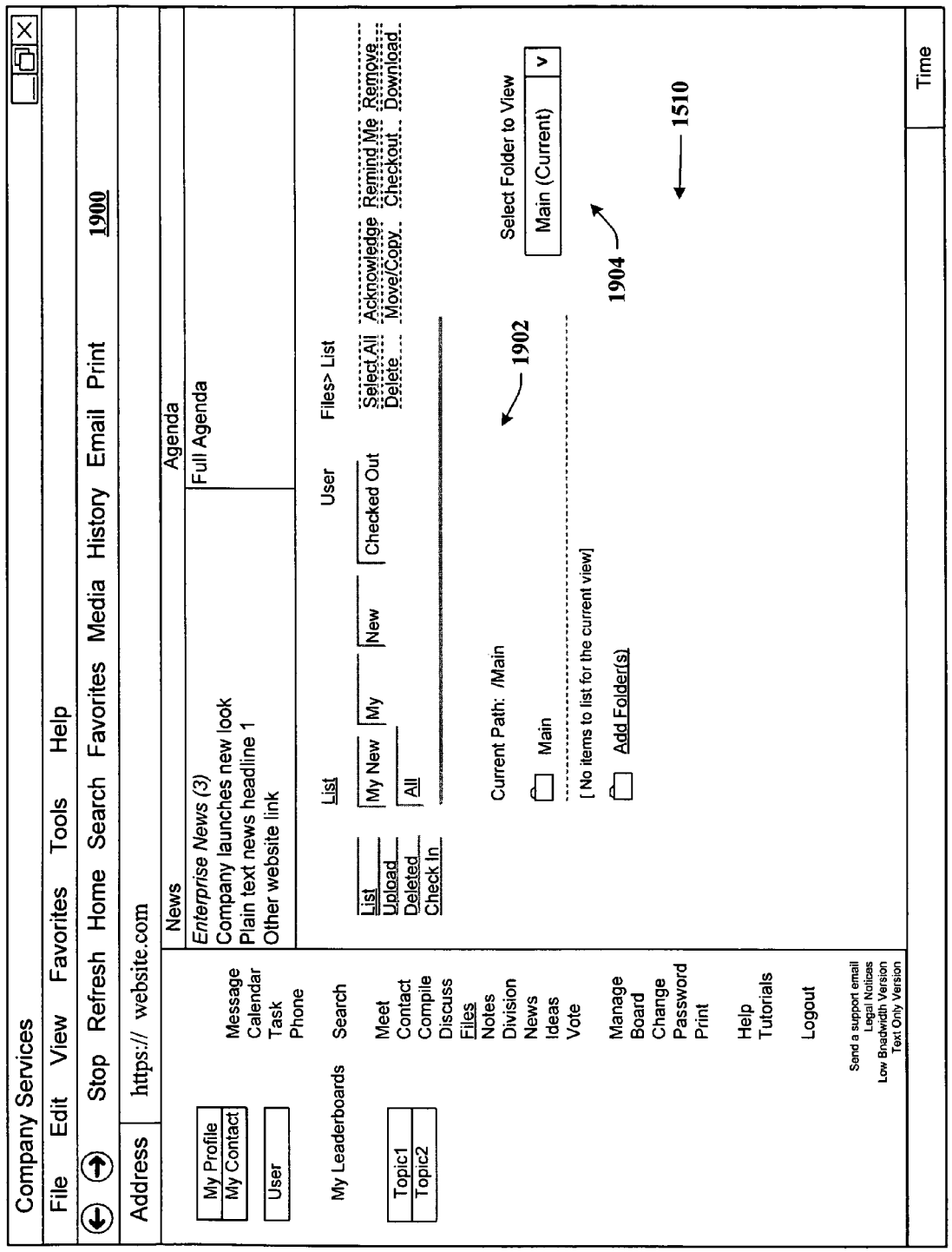
FIG. 19 illustrates a screenshot of a management tool window of a browser used as a user interface to facilitate user interaction with a files option in accordance with the present invention.

Referring now to FIG. 19, there is illustrated a screenshot of a management tool window 1900 of a browser used as a user interface to facilitate user interaction with a files option in accordance with the present invention. The window 1900 includes many of the same fields and informational areas of the previous windows (e.g., areas 1502, 1504, 1506, and 1508 of window 1500 of FIG. 15). Here, the sub-options include List, Upload, Deleted, and Check In. Thus, data can at least be listed, uploaded to the system and/or a board, deleted from the system and/or board, and checked in from a previous checkout process.

The window 1900 includes the central viewing area 1510 for viewing information requested or selected for presentation. There is also a user control area 1902 that facilitates listing user documents that are checked out of the system or board. There is also provided a dropdown menu 1904 for selecting from a number of folder viewing options.

Other user-selectable options are provided such that the user can manipulate documents, including, but not limited to, Select All, Delete, Acknowledge, Remind Me, Remove, Move/Copy, Check Out and Download.

Figure 20:
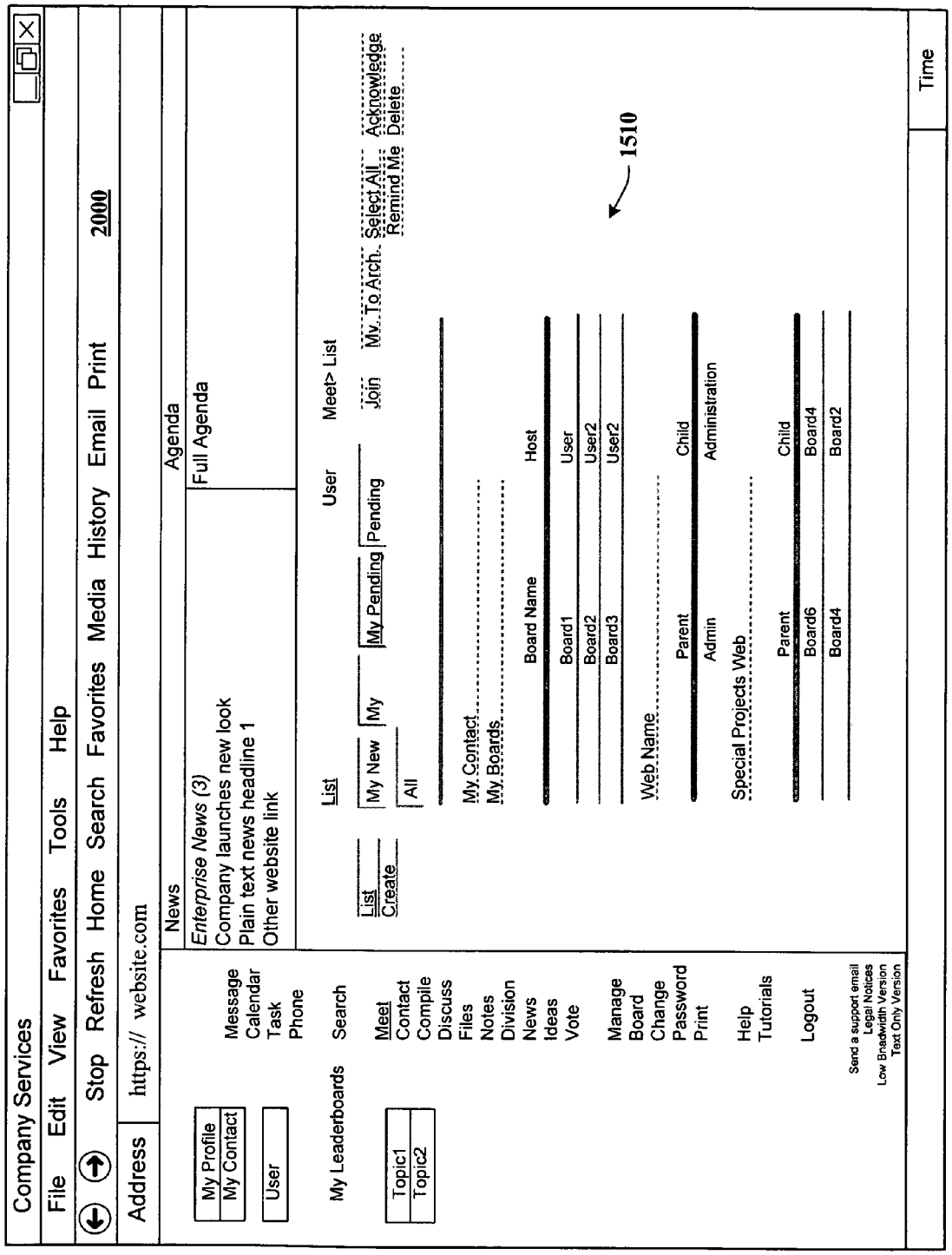
FIG. 20 illustrates a screenshot of a management tool window of a browser used as a user interface to facilitate user interaction with a user context in accordance with the present invention.

Referring now to FIG. 20, there is illustrated a screenshot of a management tool window of a browser used as a user interface to facilitate user interaction with a user context in accordance with the present invention. Here, the My Context option was selected while in the Meet application option. Thus, the context information of the user is posted within the meeting space. The window 2000 also includes many of the same fields and informational areas of the previous windows (e.g., areas 1502, 1504, 1506, and 1508 of window 1500 of FIG. 15). Here, the sub-options associated with Meet include List and Create. Thus, data can at least be listed and created in accordance with the associated need. Note that other data can also be accessed and presented within an application option, for example, My Profile will show the user profile data.

The window 2000 includes the central viewing area 1510 for viewing information requested or selected for presentation. Here, the user has selected the presentation of the user context information, which also includes board information and relationships. For example, board names Board1, Board2, and Board3 are listed, along with the hosts, User (the current user) for Board1, and User2 for both boards Board2 and Board3. The web name is also listed for the collection of these three boards.

There is a Special Projects Web listed, and the associated parent/child relationships of the associated boards. For example, Board6 is a parent to Board4, and Board4 is also a parent to Board2.

Other user-selectable options are provided for the Meet option, such as Join, Move to Archive, Select All, Delete, Acknowledge, and Remind Me.

These are but only a few of the numerous windows employed to facilitate user interaction, input, and control of the management tool system. Many other windows are provided to support, for example, printing, user help, communications security, presenting user documents to other users, metering user performance, dialog and discovery forums, calendar functions, task functions, leadership tools, file system management, user context, telephone services, e-mail, voicemail, faxes, video conferencing, web conferencing, security video, reverse 911, voice broadcasting, first response unified messaging capabilities, specialized APIs, software development kit, conduct and store meetings, organizing personal contact information, enterprise webs, chat sessions, intellectual notes and ideas, workflows, compilations, user profiles, news, searching, user alerts, integration of third-party users and resources, multimedia information, user permissions, system configuration, and wireless portable device interfaces, just to name a few.

Figure 21:
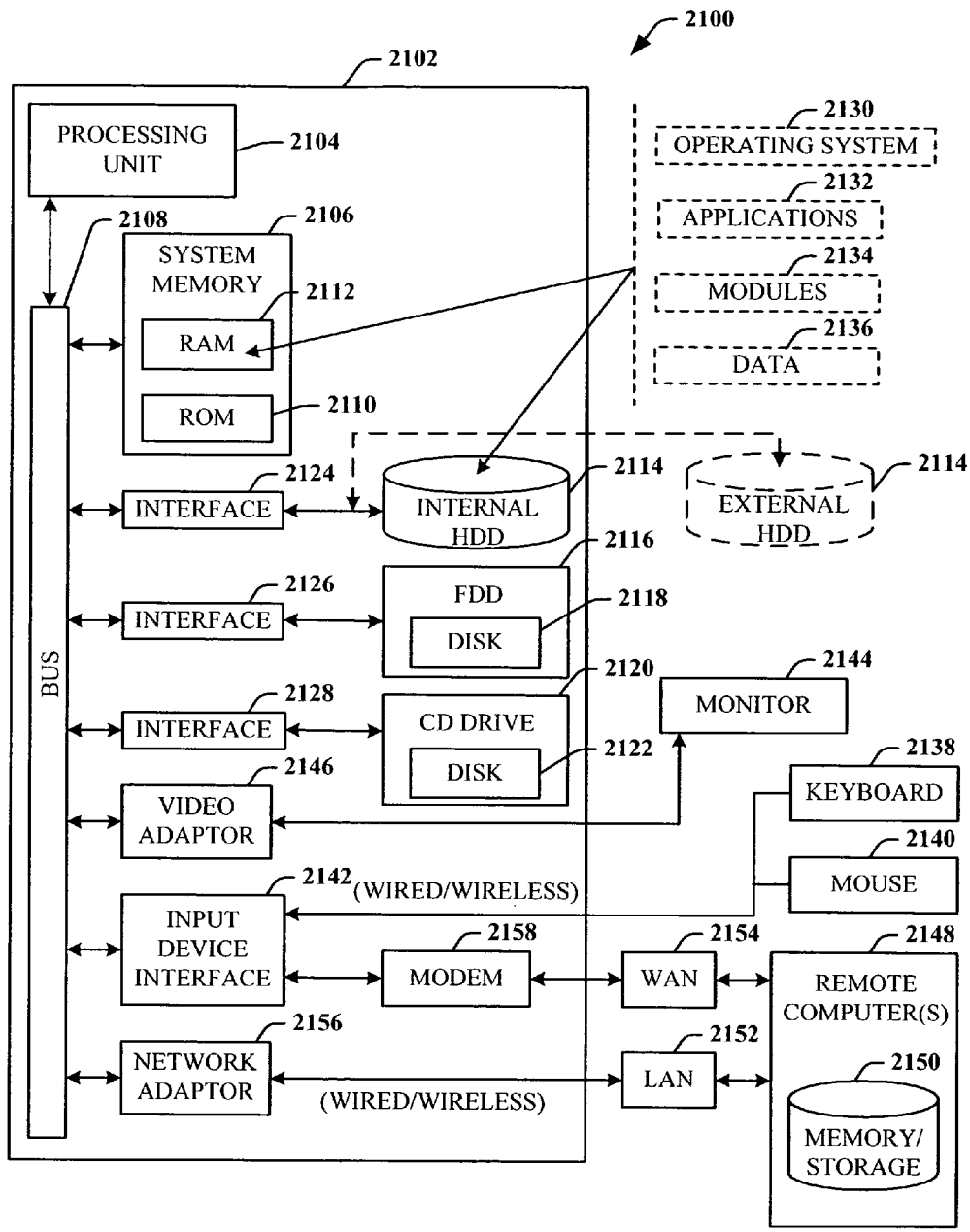
FIG. 21 illustrates a block diagram of a computer operable to execute the disclosed architecture.

Referring now to FIG. 21, there is illustrated a block diagram of a computer operable to execute the disclosed architecture. In order to provide additional context for various aspects of the present invention, FIG. 21 and the following discussion are intended to provide a brief, general description of a suitable computing environment 2100 in which the various aspects of the present invention may be implemented. While the invention has been described above in the general context of computer-executable instructions that may run on one or more computers, those skilled in the art will recognize that the invention also may be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods may be practiced with other computer system configurations, including single-processor or multiprocessor computer systems, minicomputers, mainframe computers, as well as personal computers, hand-held computing devices, microprocessor-based or programmable consumer electronics, and the like, each of which may be operatively coupled to one or more associated devices.

The illustrated aspects of the invention may also be practiced in distributed computing environments where certain tasks are performed by remote processing devices that are linked through a communications network. In a distributed computing environment, program modules may be located in both local and remote memory storage devices.

A computer typically includes a variety of computer-readable media. Computer-readable media can be any available media that can be accessed by the computer and includes both volatile and nonvolatile media, removable and non-removable media. By way of example, and not limitation, computer readable media can comprise computer storage media and communication media. Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital video disk (DVD) or other optical disk storage, magnetic cassettes, magnetic tape, magnetic disk storage or other magnetic storage devices, or any other medium which can be used to store the desired information and which can be accessed by the computer.

With reference again to FIG. 21, there is illustrated an exemplary environment 2100 for implementing various aspects of the invention that includes a computer 2102, the computer 2102 including a processing unit 2104, a system memory 2106 and a system bus 2108. The system bus 2108 couples system components including, but not limited to, the system memory 2106 to the processing unit 2104. The processing unit 2104 may be any of various commercially available processors. Dual microprocessors and other multi-processor architectures may also be employed as the processing unit 2104.

The system bus 2108 can be any of several types of bus structure that may further interconnect to a memory bus (with or without a memory controller), a peripheral bus, and a local bus using any of a variety of commercially available bus architectures. The system memory 2106 includes read only memory (ROM) 2110 and random access memory (RAM) 2112. A basic input/output system (BIOS) is stored in a non-volatile memory 2110 such as ROM, EPROM, EEPROM, which BIOS contains the basic routines that help to transfer information between elements within the computer 2102, such as during start-up. The RAM 2112 can also include a high-speed RAM such as static RAM for caching data.

The computer 2102 further includes an internal hard disk drive (HDD) 2114 (e.g., EIDE, SATA), which internal hard disk drive 2114 may also be configured for external use in a suitable chassis (not shown), a magnetic floppy disk drive (FDD) 2116, (e.g., to read from or write to a removable diskette 2118) and an optical disk drive 2120, (e.g., reading a CD-ROM disk 2122 or, to read from or write to other high capacity optical media such as the DVD). The hard disk drive 2114, magnetic disk drive 2116 and optical disk drive 2120 can be connected to the system bus 2108 by a hard disk drive interface 2124, a magnetic disk drive interface 2126 and an optical drive interface 2128, respectively. The interface 2124 for external drive implementations includes at least one or both of Universal Serial Bus (USB) and IEEE 1394 interface technologies.

The drives and their associated computer-readable media provide nonvolatile storage of data, data structures, computer-executable instructions, and so forth. For the computer 2102, the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer, such as zip drives, magnetic cassettes, flash memory cards, cartridges, and the like, may also be used in the exemplary operating environment, and further, that any such media may contain computer-executable instructions for performing the methods of the present invention.

A number of program modules can be stored in the drives and RAM 2112, including an operating system 2130, one or more application programs 2132, other program modules 2134 and program data 2136. All or portions of the operating system, applications, modules, and/or data can also be cached in the RAM 2112.

It is appreciated that the present invention can be implemented with various commercially available operating systems or combinations of operating systems.

A user can enter commands and information into the computer 2102 through one or more wired/wireless input devices, e.g., a keyboard 2138 and a pointing device, such as a mouse 2140. Other input devices (not shown) may include a microphone, an IR remote control, a joystick, a game pad, a stylus pen, touch screen, or the like. These and other input devices are often connected to the processing unit 2104 through an input device interface 2142 that is coupled to the system bus 2108, but may be connected by other interfaces, such as a parallel port, an IEEE 1394 serial port, a game port, a USB port, an IR interface, etc.

A monitor 2144 or other type of display device is also connected to the system bus 2108 via an interface, such as a video adapter 2146. In addition to the monitor 2144, a computer typically includes other peripheral output devices (not shown), such as speakers, printers, etc.

The computer 2102 may operate in a networked environment using logical connections via wired and/or wireless communications to one or more remote computers, such as a remote computer(s) 2148. The remote computer(s) 2148 may be a workstation, a server computer, a router, a personal computer, portable computer, microprocessor-based entertainment appliance, a peer device or other common network node, and typically includes many or all of the elements described relative to the computer 2102, although, for purposes of brevity, only a memory storage device 2150 is illustrated. The logical connections depicted include wired/wireless connectivity to a local area network (LAN) 2152 and/or larger networks, e.g., a wide area network (WAN) 2154. Such LAN and WAN networking environments are commonplace in offices, and companies, and facilitate enterprise-wide computer networks, such as intranets, all of which may connect to a global communication network, e.g., the Internet.

When used in a LAN networking environment, the computer 2102 is connected to the local network 2152 through a wired and/or wireless communication network interface or adapter 2156. The adaptor 2156 may facilitate wired or wireless communication to the LAN 2152, which may also include a wireless access point disposed thereon for communicating with the wireless adaptor 2156. When used in a WAN networking environment, the computer 2102 can include a modem 2158, or is connected to a communications server on the LAN, or has other means for establishing communications over the WAN 2154, such as by way of the Internet. The modem 2158, which may be internal or external and a wired or wireless device, is connected to the system bus 2108 via the serial port interface 2142. In a networked environment, program modules depicted relative to the computer 2102, or portions thereof, may be stored in the remote memory/storage device 2150. It will be appreciated that the network connections shown are exemplary and other means of establishing a communications link between the computers may be used.

The computer 2102 is operable to communicate with any wireless devices or entities operably disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication may be a predefined structure as with conventional network or simply an ad hoc communication between at least two devices.

Wi-Fi or Wireless Fidelity, allows connection to the Internet from a couch at home, a bed in a hotel room or a conference room at work, without wires. Wi-Fi is a wireless technology like a cell phone that enables such devices, e.g., computers, to send and receive data indoors and out, and anywhere within the range of a base station. Wi-Fi networks use radio technologies called IEEE 802.11 (a, b, g, etc.) to provide secure, reliable, fast wireless connectivity. A Wi-Fi network can be used to connect computers to each other, to the Internet, and to wired networks (which use IEEE 802.3 or Ethernet). Wi-Fi networks operate in the unlicensed 2.4 and 5 GHz radio bands, with an 11 Mbps (802.11a) or 54 Mbps (802.11b) data rate or with products that contain both bands (dual band), so the networks can provide real-world performance similar to the basic 10BaseT wired Ethernet networks used in many offices.

What has been described above includes examples of the present invention. It is, of course, not possible to describe every conceivable combination of components or methodologies for purposes of describing the present invention, but one of ordinary skill in the art may recognize that many further combinations and permutations of the present invention are possible. Accordingly, the present invention is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A computer-implemented network-based system that facilitates management of data, comprising:

a computer-implemented context component of the network-based system for capturing context information associated with user-defined data created by user interaction of a user in a first context of the network-based system, the context component dynamically storing the context information in metadata associated with the user-defined data, the user-defined data and metadata stored on a storage component of the network-based system; and a computer-implemented tracking component of the network-based system for tracking a change of the user from the first context to a second context of the network-based system and dynamically updating the stored metadata based on the change, wherein the user accesses the data from the second context.

2. The system of claim 1, the context component is associated with a workspace, which is a collection of data and application functionality related to the user-defined data.

3. The system of claim 1, the context component is associated with a web, which web is a collection of interrelated workspaces, the web maintains a location of data of the respective interrelated workspaces when one or more of the interrelated workspaces are moved into a different workspace interrelationship.

4. The system of claim 1, the context information includes a relationship between the user and at least one of an application, application data, and user environment.

5. The system of claim 1, the context component captures context information of the first context and context information related to at least one other context.

6. The system of claim 5, the context information of the at least one other context is at least one of stipulated by the user and suggested automatically by the system based upon search and association criteria set by the user.

7. The system of claim 1, wherein data created in the first context is associated with data created in the second context.

8. The system of claim 1, the context information is tagged to the user-defined data via the metadata when the user-defined data is created.

9. A computer-implemented method of managing data, comprising computer-executable acts of:

creating data within a user environment of a web-based computing platform via user interaction with the user environment by a user using an application, the data in the form of at least files and documents;

dynamically associating metadata with the data, the data and metadata stored on a storage component of the web-based computing platform, the metadata includes information related to the user, the data, the application, and the user environment;

tracking movement of the user from the user environment of the web-based computing platform to a second user environment of the web-based computing platform; and dynamically updating the stored metadata with an association of the data, the application, and the second user environment wherein the user employs at least one of the application and the data from the second environment.

10. The method of claim 9, further comprising capturing context information of the user.

11. The method of claim 9, further comprising indexing content of the user environment such that a plurality of users can access the content from an associated plurality of user environments.

12. The method of claim 9, the least one of the data and the application is associated automatically with the second user environment.

13. The method of claim 9, further comprising accessing the user environment and the second user environment using a browser.

14. The method of claim 9, further comprising communicating with the user environment using a TCP/IP communication protocol.

15. The method of claim 9, further comprising locating the user environment from a remote location using a URL address.

16. The method of claim 9, further comprising accessing the user environment via a portable wireless device.

17. A computer-implemented method of managing data, comprising computer-executable acts of:

generating a plurality of user environments in a web-based system;

ordering two or more of the plurality of user environments according to different arrangements of the user environments;

providing a plurality of applications for generating and processing data in the user environments, data of a user environment is dynamically associated with the user environment in metadata that corresponds to the data;

creating an association of the data with a second user environment when the data is accessed from the second user environment;

dynamically storing the association of the data and the second user environment in the metadata;

storing in a storage component ordering information related to the ordering of the two or more of the plurality of user environments; and traversing the different arrangements of the user environments with one or more of the applications based on the ordering information to locate the data associated with the user environments.

18. The method of claim 17, the act of traversing is performed using a webslice that includes traversal information for locating the data associated with a given user environment.

19. The method of claim 18, the traversal information includes at least a collection ID, a user environment ID, and a routing path to the location of the environment data.

20. The method of claim 17, the different arrangements, user environments, and associated data carry both hierarchical and non-hierarchical associations simultaneously within the plurality of applications.

21. A computer-readable medium for storing computer-executable instructions for a method of managing data, the method comprising:

creating data related to user interaction of a user within a user workspace of a web-based computing platform using an application;

dynamically associating metadata with the data, the data and metadata stored on the web-based computing platform, the metadata includes information related to the user of the user workspace, to the data, to the application and to the user workspace;

tracking movement of the user from the user workspace to a second user workspace of the web-based computing platform;

dynamically associating the data and the application with the second user workspace in the metadata such that the user employs the application and data from the second user workspace; and indexing the data created in the user workspace such that a plurality of different users can access the data via the metadata from a corresponding plurality of different user workspaces.

22. A computer-implemented system that facilitates management of data, comprising:
- computer-implemented means for creating data by interaction of a user within a user workspace of a server using an application;
- computer-implemented means for associating metadata with the data, the metadata stored in association with the data on storage means of the server, the metadata includes information related to a user of the user workspace, to the data, to the application and to the user workspace;
- computer-implemented means for tracking movement of the user from the user workspace to a second user workspace of the server; and
- computer-implemented means for dynamically associating the data and the application with the second user workspace in the metadata such that the user can employ the application and data from the second user workspace.

23. A computer-implemented system that facilitates management of data, comprising:
- a computer-implemented context component of a web-based server for defining a first user workspace of the web-based server, assigning one or more applications to the first user workspace, capturing context data associated with user interaction of a user while in the first user workspace, and for dynamically storing the context data as metadata on a storage component of the web-based server, which metadata is dynamically associated with data created in the first user workspace; and
- a computer-implemented tracking component of the web-based server for tracking change information associated with a change in access of the user from the first user workspace to a second user workspace, and dynamically storing the change information on the storage component as part of the metadata, wherein the user accesses the data from the second user workspace.

24. The system of claim 23, wherein the tracking component automatically creates the metadata when the user accesses the first user workspace.

25. The system of claim 23, wherein the context component captures relationship data associated with a relationship between the first user workspace and at least one other user workspace.

26. The system of claim 23, wherein an application associated with the first user workspace is automatically accessible via the second user workspace when the user moves from the first user workspace to the second user workspace.

27. The system of claim 23, wherein context data relating to an item of communication is automatically stored and used in performance of communication tasks.

28. The system of claim 23, wherein the context component captures data and application functionality related to a user-defined topic of the first user workspace, and includes the data and application functionality in the metadata.

29. The system of claim 23, wherein when the data created in the first user workspace is accessed from the second user workspace, in response to which the context component adds information to the metadata about the second user workspace.

30. The system of claim 23, wherein the first user workspace is associated with a plurality of different applications, the plurality of different applications comprising telephony, unified messaging, decision support, document management, portals, chat, collaboration, search, vote, relationship management, calendar, personal information management, profiling, directory management, executive information systems, dashboards, cockpits, tasking, meeting and, web and video conferencing.

31. The system of claim 23, wherein the storage component stores the data and the metadata according to at least one of a relational and an object storage methodology.

32. The system of claim 23, wherein storing of the metadata in the storage component in association with data facilitates many-to-many functionality of the data via the metadata.

33. The system of claim 23, wherein the first user workspace provides access to at least one communications tool, which includes e-mail, voicemail, fax, teleconferencing, instant message, chat, contacts, calendar, task, notes, news, ideas, vote, web and video conferencing, and document sharing functionality.

34. The system of claim 23, wherein one or more applications include file storage pointers that are dynamic and associated with the first user workspace.

35. The system of claim 23, wherein the context component facilitates encryption of the data generated in the first user workspace.

* * * * *

(12) EX PARTE REEXAMINATION CERTIFICATE (9444th)
United States Patent
McKibben et al.

(10) Number: US 7,139,761 C1
(45) Certificate Issued: Dec. 17, 2012

(54) DYNAMIC ASSOCIATION OF ELECTRONICALLY STORED INFORMATION WITH ITERATIVE WORKFLOW CHANGES

(75) Inventors: Michael T. McKibben, Columbus, OH (US); Jeffrey R. Lamb, Westerville, OH (US)

(73) Assignee: Leader Technologies, Inc., Westerville, OH (US)

Reexamination Request:
No. 90/010,591, Jul. 2, 2009

Reexamination Certificate for:
Patent No.: 7,139,761
Issued: Nov. 21, 2006
Appl. No.: 10/732,744
Filed: Dec. 10, 2003

Related U.S. Application Data

(60) Provisional application No. 60/432,255, filed on Dec. 11, 2002.

(51) Int. Cl.
*G06F 17/30* (2006.01)
(52) U.S. Cl. .................................................. 707/969
(58) Field of Classification Search .................. None
See application file for complete search history.

(56) References Cited

To view the complete listing of prior art documents cited during the proceeding for Reexamination Control Number 90/010,591, please refer to the USPTO's public Patent Application Information Retrieval (PAIR) system under the Display References tab.

*Primary Examiner* — Deandra M Hughes

(57) ABSTRACT

A data management tool. The tool is a unified, horizontal system for communications, organization, information processing, and data storage. The tool operates seamlessly with existing platforms, and is a common workflow layer that is automated with a scalable, relational database. The tool uses one or both of a relational and object database engine that facilitates at least many-to-many relationships among data elements. The highest contextual assumption is that there exists an entity that consists of one or more users. The data storage model first assumes that files are associated with the user. Thus, data generated by applications is associated with an individual, group of individuals, and topical content and not simply with a folder, as in traditional systems.

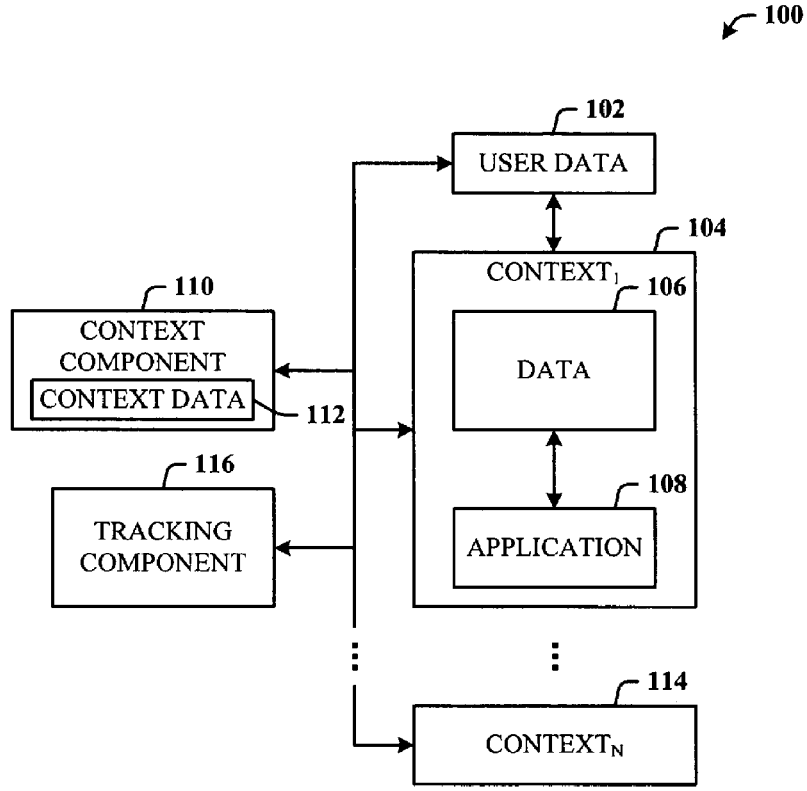

EX PARTE REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claims 2, 5, 6, 8, 10, 12-15, 22, 24, 26-29 and 33-35 is confirmed.

Claims 1, 3-4, 7, 9, 11, 16-21, 23, 25 and 30-32 were not reexamined.

* * * * *

(12) INTER PARTES REEXAMINATION CERTIFICATE (884th)
United States Patent
McKibben et al.

(10) Number: US 7,139,761 C2
(45) Certificate Issued: May 21, 2014

(54) DYNAMIC ASSOCIATION OF ELECTRONICALLY STORED INFORMATION WITH ITERATIVE WORKFLOW CHANGES

(75) Inventors: Michael T. McKibben, Columbus, OH (US); Jeffrey R. Lamb, Westerville, OH (US)

(73) Assignee: Leader Technologies, Inc., Westerville, OH (US)

Reexamination Request:
No. 95/001,261, Nov. 13, 2009

Reexamination Certificate for:
Patent No.: 7,139,761
Issued: Nov. 21, 2006
Appl. No.: 10/732,744
Filed: Dec. 10, 2003

Reexamination Certificate C1 7,139,761 issued Dec. 17, 2012

Related U.S. Application Data

(60) Provisional application No. 60/432,255, filed on Dec. 11, 2002.

(51) Int. Cl.
*G06F 17/30* (2006.01)

(52) U.S. Cl.
USPC .......................................................... 707/792

(58) Field of Classification Search
None
See application file for complete search history.

(56) References Cited

To view the complete listing of prior art documents cited during the proceeding for Reexamination Control Number 95/001,261, please refer to the USPTO's public Patent Application Information Retrieval (PAIR) system under the Display References tab.

*Primary Examiner* — Deandra Hughes

(57) ABSTRACT

A data management tool. The tool is a unified, horizontal system for communications, organization, information processing, and data storage. The tool operates seamlessly with existing platforms, and is a common workflow layer that is automated with a scalable, relational database. The tool uses one or both of a relational and object database engine that facilitates at least many-to-many relationships among data elements. The highest contextual assumption is that there exists an entity that consists of one or more users. The data storage model first assumes that files are associated with the user. Thus, data generated by applications is associated with an individual, group of individuals, and topical content and not simply with a folder, as in traditional systems.

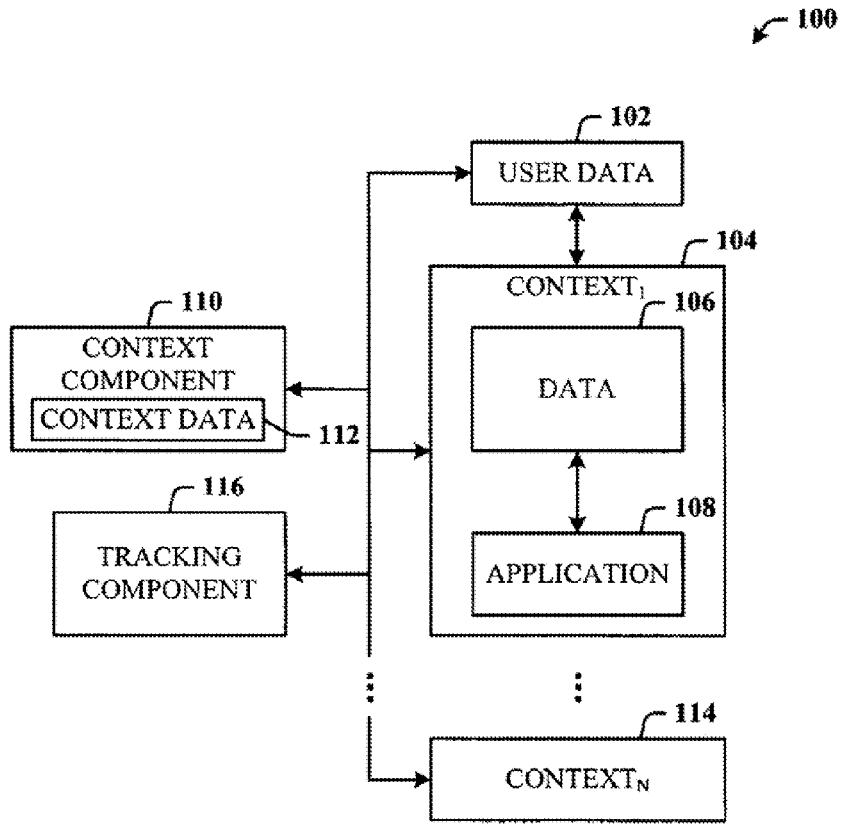

INTER PARTES REEXAMINATION CERTIFICATE ISSUED UNDER 35 U.S.C. 316

THE PATENT IS HEREBY AMENDED AS INDICATED BELOW.

AS A RESULT OF REEXAMINATION, IT HAS BEEN DETERMINED THAT:

Claims 1-16, 21, 23-26, 29 and 31-34 are cancelled.

Claims 17-20, 22, 27-28, 30 and 35 were not reexamined.

\* \* \* \* \*